US010095362B2

(12) United States Patent
Hirakata et al.

(10) Patent No.: US 10,095,362 B2
(45) Date of Patent: Oct. 9, 2018

(54) TOUCH PANEL

(71) Applicant: Semiconductor Energy Laboratory Co., Ltd., Atsugi-shi, Kanagawa-ken (JP)

(72) Inventors: Yoshiharu Hirakata, Kanagawa (JP); Daisuke Kubota, Kanagawa (JP); Kenichi Okazaki, Tochigi (JP); Shunpei Yamazaki, Tokyo (JP)

(73) Assignee: Semiconductor Energy Laboratory Co., Ltd., Atsugi-shi, Kanagawa-ken (JP)

( * ) Notice: Subject to any disclaimer, the term of this patent is extended or adjusted under 35 U.S.C. 154(b) by 218 days.

(21) Appl. No.: 15/076,950

(22) Filed: Mar. 22, 2016

(65) Prior Publication Data
US 2016/0282989 A1    Sep. 29, 2016

(30) Foreign Application Priority Data

Mar. 24, 2015  (JP) ................................ 2015-060598

(51) Int. Cl.
*G06F 3/044*  (2006.01)
(52) U.S. Cl.
CPC .... *G06F 3/044* (2013.01); *G06F 2203/04111* (2013.01); *G06F 2203/04112* (2013.01)
(58) Field of Classification Search
CPC ........... G06F 3/044; G06F 2203/04111; G06F 3/0416; G06F 2203/04112; G02F 1/133
See application file for complete search history.

(56) References Cited

U.S. PATENT DOCUMENTS

| 8,243,027 | B2 | 8/2012 | Hotelling et al. |
| 8,994,669 | B2 * | 3/2015 | Chang ..................... G06F 3/047 345/173 |
| 9,666,604 | B2 * | 5/2017 | Kimura ............... H01L 27/1225 |
| 9,759,940 | B2 * | 9/2017 | Shin ..................... G02F 1/13338 |
| 2007/0171319 | A1 * | 7/2007 | Fujita ................ G02F 1/134309 349/43 |
| 2007/0242054 | A1 * | 10/2007 | Chang ..................... G06F 3/044 345/173 |

(Continued)

FOREIGN PATENT DOCUMENTS

JP    2003-196023    7/2003

*Primary Examiner* — Nelson Rosario
*Assistant Examiner* — Eboni Hughes
(74) *Attorney, Agent, or Firm* — Fish & Richardson P.C.

(57) ABSTRACT

A lightweight touch panel is provided. A display panel includes first and second substrates, between which a liquid crystal layer is provided. The first substrate is provided with a pixel electrode, a common electrode, a transistor, and the like of a liquid crystal panel. The second substrate is provided with a touch sensor. The touch sensor includes a first electrode, two second electrodes, a third electrode, and a fourth electrode. The first electrode and the two second electrodes are formed using a first conductive film. The third and fourth electrodes are formed using a second conductive film. The first electrode extends in a first direction. The two second electrodes are provided along a second direction with the first electrode therebetween. The third electrode electrically connects the two second electrodes to each other. The fourth electrode faces the pixel electrode and the common electrode with the liquid crystal layer therebetween.

14 Claims, 18 Drawing Sheets

(56) References Cited

U.S. PATENT DOCUMENTS

| | | | |
|---|---|---|---|
| 2009/0322704 A1* | 12/2009 | Anno | G06F 3/044 345/174 |
| 2010/0053103 A1* | 3/2010 | No | G06F 3/044 345/173 |
| 2010/0134429 A1* | 6/2010 | You | G06F 3/044 345/173 |
| 2010/0134710 A1* | 6/2010 | Ishitani | G02F 1/133514 349/46 |
| 2010/0224872 A1* | 9/2010 | Kimura | H01L 27/1214 257/43 |
| 2011/0032207 A1* | 2/2011 | Huang | G06F 3/044 345/174 |
| 2011/0169783 A1* | 7/2011 | Wang | G06F 3/0412 345/176 |
| 2013/0162570 A1* | 6/2013 | Shin | G06F 3/041 345/173 |
| 2013/0257794 A1* | 10/2013 | Lee | G06F 3/041 345/174 |
| 2013/0341651 A1* | 12/2013 | Kim | H01L 31/0232 257/84 |
| 2014/0043546 A1* | 2/2014 | Yamazaki | G02F 1/13338 349/12 |
| 2014/0070350 A1* | 3/2014 | Kim | G06F 3/044 257/432 |
| 2014/0078104 A1* | 3/2014 | Lee | G06F 3/044 345/174 |
| 2014/0168150 A1* | 6/2014 | Kim | G02F 1/136204 345/174 |
| 2014/0176821 A1* | 6/2014 | Chae | G06F 3/041 349/12 |
| 2014/0184951 A1* | 7/2014 | Yeh | G06F 3/044 349/12 |
| 2014/0192278 A1* | 7/2014 | Esaka | G06F 3/044 349/12 |
| 2014/0232950 A1* | 8/2014 | Park | G06F 3/044 349/12 |
| 2014/0240617 A1* | 8/2014 | Fukutome | G02F 1/13338 349/12 |
| 2014/0285732 A1* | 9/2014 | Tanabe | G02F 1/13338 349/12 |
| 2015/0029431 A1 | 1/2015 | Fukai et al. | |
| 2015/0109548 A1* | 4/2015 | Kim | G02F 1/13338 349/12 |
| 2015/0114816 A1* | 4/2015 | Kim | G06F 3/044 200/600 |
| 2015/0144920 A1* | 5/2015 | Yamazaki | H01L 27/323 257/40 |
| 2015/0185578 A1* | 7/2015 | Hirosawa | G02F 1/133707 349/43 |
| 2015/0220204 A1* | 8/2015 | Noguchi | G06F 3/0412 345/174 |
| 2015/0255518 A1* | 9/2015 | Watanabe | H01L 27/1225 257/40 |
| 2015/0310793 A1 | 10/2015 | Kawashima et al. | |
| 2015/0346866 A1* | 12/2015 | Kusunoki | G06F 1/1652 345/174 |
| 2015/0349041 A1 | 12/2015 | Miyake | |
| 2015/0372026 A1* | 12/2015 | Sato | H01L 27/1255 257/71 |
| 2016/0103537 A1* | 4/2016 | Park | G06F 3/0412 345/174 |
| 2016/0132281 A1* | 5/2016 | Yamazaki | G06F 1/1446 345/1.3 |
| 2016/0179259 A1* | 6/2016 | Watanabe | G06F 3/044 345/174 |
| 2016/0195983 A1* | 7/2016 | Miyake | G06F 3/0416 345/174 |
| 2016/0253024 A1* | 9/2016 | Aoyama | G06F 3/0416 345/174 |
| 2016/0274398 A1* | 9/2016 | Hirakata | G06F 3/0416 |
| 2016/0274699 A1* | 9/2016 | Shishido | G06F 3/044 |
| 2016/0282989 A1* | 9/2016 | Hirakata | G06F 3/044 |
| 2016/0349557 A1* | 12/2016 | Shishido | G02F 1/13338 |
| 2016/0349558 A1* | 12/2016 | Shishido | G02F 1/13338 |
| 2016/0378233 A1* | 12/2016 | Huo | G06F 3/0412 345/174 |
| 2017/0023817 A1* | 1/2017 | Hayashi | G02F 1/13338 |
| 2017/0033233 A1* | 2/2017 | Yamazaki | H01L 29/78606 |
| 2017/0075452 A1* | 3/2017 | Kim | G06F 3/044 |
| 2017/0104090 A1* | 4/2017 | Koezuka | H01L 29/66969 |
| 2017/0131844 A1* | 5/2017 | Kurashima | G06F 3/0418 |
| 2017/0147116 A1* | 5/2017 | Lee | H01L 27/323 |
| 2017/0147128 A1* | 5/2017 | Ishizaki | G06F 3/0412 |
| 2017/0168336 A1* | 6/2017 | Hwang | G02F 1/13338 |
| 2017/0168612 A1* | 6/2017 | Lee | G06F 3/044 |
| 2017/0168642 A1* | 6/2017 | Lee | G06F 3/0418 |
| 2017/0168650 A1* | 6/2017 | Lee | G06F 3/0418 |
| 2017/0192585 A1* | 7/2017 | Ma | G06F 3/044 |
| 2017/0220157 A1* | 8/2017 | Yoo | G06F 3/044 |
| 2017/0228067 A1* | 8/2017 | Kim | G06F 3/044 |
| 2017/0228079 A1* | 8/2017 | Kurasawa | G06F 3/0412 |
| 2017/0255296 A1* | 9/2017 | Takiguchi | G06F 3/044 |
| 2017/0255299 A1* | 9/2017 | Shimoshikiryoh | G06F 3/044 |
| 2017/0269440 A1* | 9/2017 | Yoshitomi | G02F 1/134309 |
| 2017/0300156 A1* | 10/2017 | Oh | G02F 1/13338 |
| 2017/0308201 A1* | 10/2017 | Xie | G06F 3/044 |
| 2017/0308211 A1* | 10/2017 | Adachi | G02F 1/13338 |
| 2017/0315666 A1* | 11/2017 | Anno | G09G 3/36 |
| 2017/0322440 A1* | 11/2017 | Li | G06F 3/044 |
| 2017/0322674 A1* | 11/2017 | Rosenberg | G06F 3/03545 |
| 2017/0330917 A1* | 11/2017 | Kim | G06F 3/0412 |

* cited by examiner

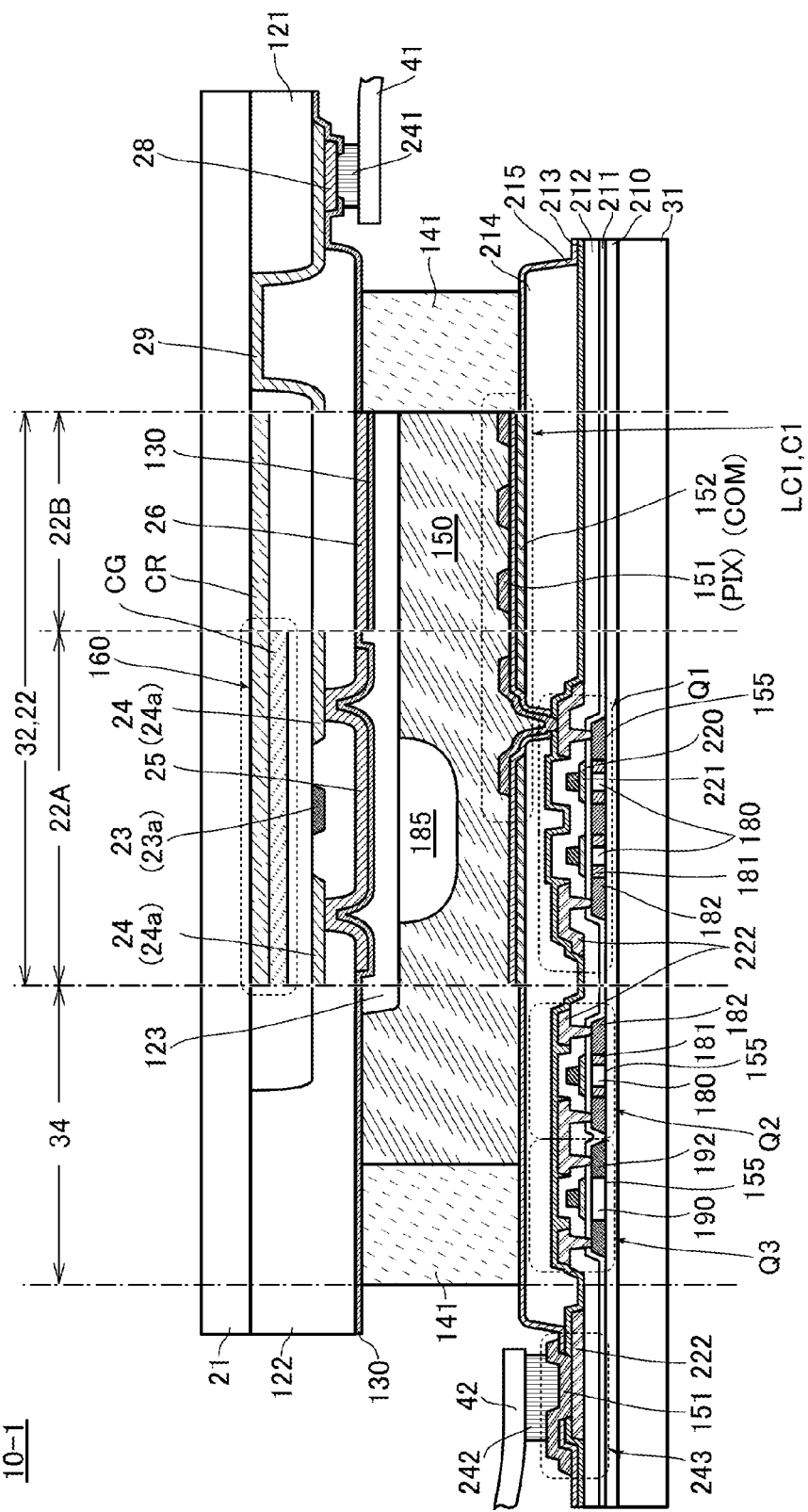

10-2

10-6

FIG. 15A
FIG. 15C
FIG. 15B
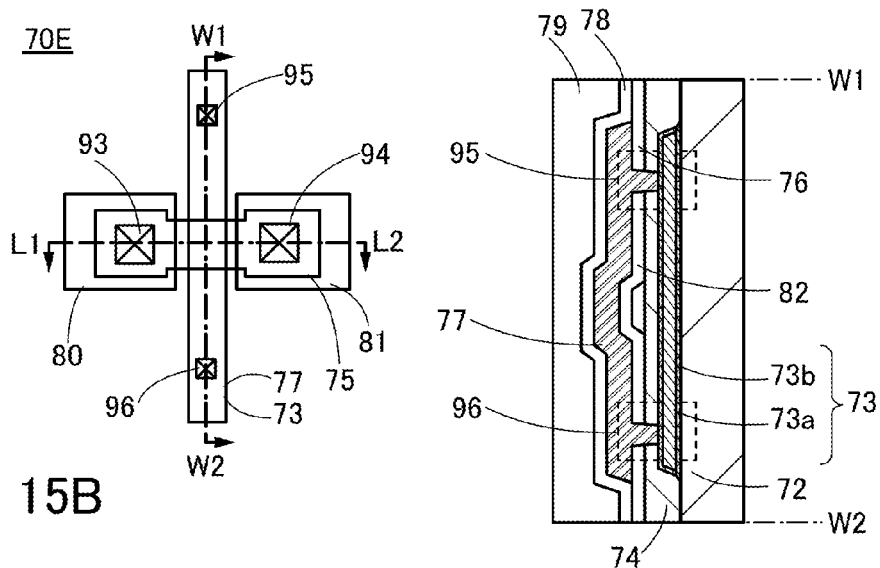
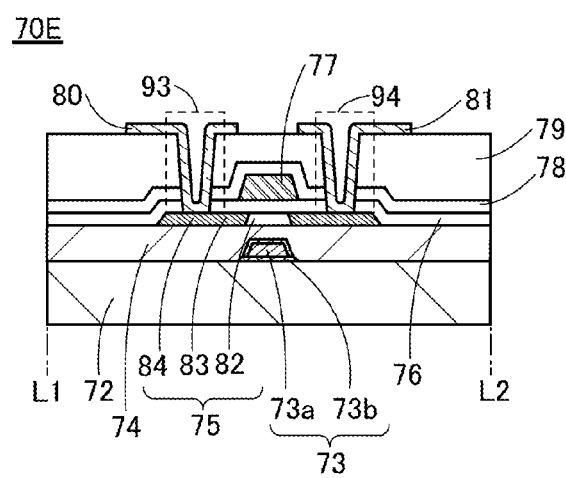

TOUCH PANEL

BACKGROUND OF THE INVENTION

1. Field of the Invention

One embodiment of the present invention relates to a semiconductor device such as a display device, a touch panel, or an input device. In this specification and the like, a semiconductor device generally means a device that can function by utilizing semiconductor characteristics. A semiconductor element such as a transistor, a semiconductor circuit, a display device, a touch panel, an input/output device, an imaging device, a light-emitting device, and an electronic device are each an embodiment of a semiconductor device. Devices such as a semiconductor circuit, a display device, a touch panel, and an electronic device include a semiconductor device in some cases.

2. Description of the Related Art

A touch sensor is mounted in an information terminal as an input unit instead of a keyboard, for increasing the screen size, reducing the weight, and improving the convenience. Examples of such an information terminal include a smartphone, a navigation system, a tablet computer, and an e-book reader. These information terminals have a problem of the increased thickness because a touch sensor overlaps with a display portion.

To solve this problem, Patent Document 1 describes that a thin display device can be provided by oppositely disposing a substrate provided with a driver circuit for displaying images and a substrate provided with an element for detecting the coordinates, for example.

REFERENCE

Patent Document

[Patent Document 1] Japanese Published Patent Application No. 2003-196023

SUMMARY OF THE INVENTION

An object of one embodiment of the present invention is to provide a lightweight touch panel or a thin touch panel, or to provide a novel semiconductor device.

One embodiment of the present invention is a touch panel including a first substrate, a second substrate, a liquid crystal layer, a pixel electrode, a common electrode, and a touch sensor. The first substrate and the second substrate face each other; the liquid crystal layer is provided between the first substrate and the second substrate; the first substrate is provided with the pixel electrode and the common electrode; alignment of the liquid crystal layer can be controlled by an electric field between the pixel electrode and the common electrode; the second substrate is provided with the touch sensor; the touch sensor includes a first electrode, two second electrodes, a third electrode, and a fourth electrode; the first electrode and the two second electrodes are formed using a first conductive film; the third electrode and the fourth electrode are formed using a second conductive film; the first electrode and the two second electrodes are each a mesh electrode having a plurality of openings; the first electrode extends in a first direction; the two second electrodes are provided along a second direction with the first electrode therebetween; the two second electrodes are electrically connected to each other by the third electrode; the third electrode includes a region overlapping with the first electrode; and the fourth electrode is provided to face the pixel electrode and the common electrode with the liquid crystal layer therebetween.

In the above embodiment, the second conductive film can include a metal oxide film.

In the above embodiment, the second substrate may be provided with a light-blocking layer and a color filter. In this case, in each of the first electrode and the two second electrodes, a portion formed using the first conductive film overlaps with the light-blocking layer and the plurality of openings overlap with the color filter.

One embodiment of the present invention can provide a lightweight touch panel or a thin touch panel, or provide a novel semiconductor device.

BRIEF DESCRIPTION OF THE DRAWINGS

In the accompanying drawings:

FIG. 5 is a cross-sectional view illustrating a structure example of a touch panel module;

FIGS. 15A to 15C are a top view and cross-sectional views illustrating a structure example of a transistor;

DETAILED DESCRIPTION OF THE INVENTION

Figure 1A:
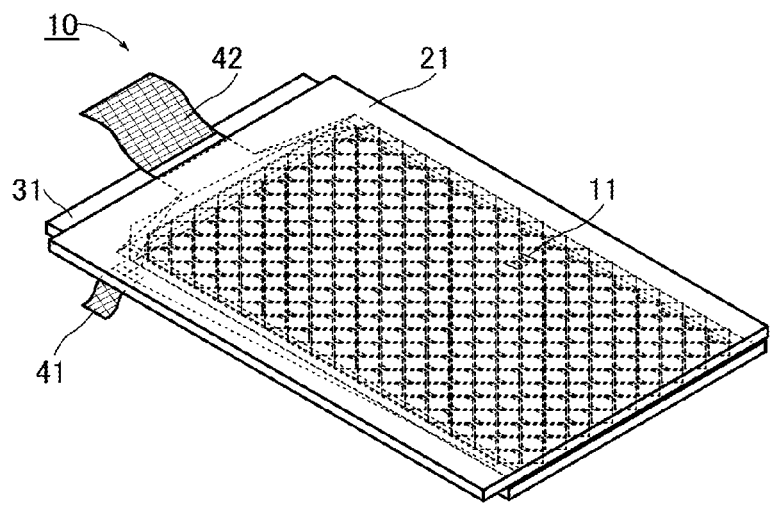
FIGS. 1A and 1B show a structure example of a touch panel module.

Embodiments of the present invention will be described below. Note that the present invention is not limited to the following description. It will be readily appreciated by those skilled in the art that modes and details of the present invention can be modified in various ways without departing from the spirit and scope of the present invention. One embodiment of the present invention therefore should not be construed as being limited to the following description of the embodiments.

Any of the embodiments described below can be combined as appropriate. In addition, in the case where some structure examples (including a fabrication method, an operating method, and the like) are given in one embodiment, any of the structure examples can be combined as appropriate, and any of the structure examples can be combined with one or more structure examples described in the other embodiments.

In the drawings, the same components, components having similar functions, components formed of the same material, or components formed at the same time are denoted by the same reference numerals in some cases, and description thereof is not repeated in some cases.

Note that, in each drawing described in this specification, the size, the layer thickness, or the region of each component is exaggerated for clarity in some cases. Therefore, embodiments of the present invention are not limited to such a scale.

Note that, in this specification and the like, ordinal numbers such as "first," and "second" are used to avoid confusion among components in some cases, and the terms do not limit the components numerically in such cases.

Note that the terms "film" and "layer" can be interchanged with each other in some cases. For example, the term "conductive film" can be used instead of the term "conductive layer," and the term "insulating layer" can be used instead of the term "insulating film," in some cases.

Embodiment 1

In this embodiment, a structure example of an input device (a touch sensor), and a structure example of an input/output device (a touch panel) including the input device of one embodiment of the present invention and a display device (a display panel) are described.

In this specification and the like, a touch panel has a display function capable of displaying or outputting an image or the like on or to a display surface and a touch-sensor function capable of sensing contact or proximity of an object such as a finger or a stylus on or to the display surface. Thus, the touch panel is one embodiment of an input/output device.

In this specification and the like, a structure in which a connector such as a flexible printed circuit (FPC) or a tape carrier package (TCP) is attached to a substrate of a touch panel, or a structure in which an integrated circuit (IC) is directly mounted on a substrate by a chip on glass (COG) method is referred to as a touch panel module or simply as a touch panel in some cases.

In the description below, a capacitive touch sensor is used as the touch sensor of one embodiment of the present invention. Examples of the capacitive touch sensor are of a surface capacitive type, of a projected capacitive type, and the like. Examples of the projected capacitive type are of a self-capacitive type, of a mutual capacitive type, and the like mainly in accordance with the difference in the driving method. The use of a mutual capacitive touch sensor is preferable because multiple points can be sensed simultaneously.

A capacitive touch sensor includes a pair of conductive layers with a dielectric sandwiched therebetween, which produce capacitance. The capacitance produced between the pair of conductive layers changes when an object touches or gets close to the pair of conductive layers. Utilizing this change, sensing can be carried out. Each of the pair of conductive layers preferably has an opening, and further preferably has a mesh shape having a plurality of openings. The opening and the display element preferably overlap with each other. Such a structure enables extraction of light emitted from the display element to the outside through the opening, and therefore, the pair of conductive layers do not necessarily have a light-transmitting property. Thus, a material such as metal or alloy that has lower resistance than a light-transmitting conductive material can be used as a material for the pair of conductive layers. This can reduce delay of the detection signal and increase the detection sensitivity of the touch panel. In addition, it becomes easier to increase the size of the touch sensor; therefore, the touch sensor can be applied to not only portable electronic devices but also electronic devices with a large screen such as televisions.

In the case where the pair of conductive layers in the touch sensor each have a mesh shape, the pair of conductive layers are arranged to avoid an optical path of the light from the display element, whereby moiré is less likely to occur. Therefore, a touch panel with extremely high display quality can be provided. Here, moiré means interference fringe created when two or more periodic patterns are laid on top of one another.

The display device of the touch panel is preferably an active matrix display device. As a display element of the display device, a variety of display elements including a liquid crystal element, an optical element which utilizes micro electro mechanical systems (MEMS), a light-emitting element such as an organic electroluminescent (EL) element or a light-emitting diode (LED), and an electrophoretic element can be used.

A reflective liquid crystal display device in which liquid crystal elements are used is preferably applied to the display device of the touch panel. The use of the reflective liquid crystal display device can considerably reduce power consumption as compared to a transmissive liquid crystal display device.

Moreover, the pair of conductive layers included in the touch sensor is preferably provided between a pair of substrates included in the touch panel. In particular, the conductive layer included in the touch sensor preferably has a plurality of openings. Such a conductive layer can have a smaller surface area. Therefore, electrical noise in driving of the display element is hardly transmitted to the conductive layer included in the touch sensor as compared with the case of using a light-transmitting conductive film without openings, for example. In other words, even when both a display element and a conductive layer included in the touch sensor are provided between the pair of substrates, high detection sensitivity can be achieved. As a result, a thin touch panel having high detection sensitivity can be provided.

The substrate provided with the pair of conductive layers included in the touch sensor may be provided with a conductive layer to which a constant potential can be supplied. Such a conductive layer can serve as a shield layer. Specifically, the conductive layer can prevent transmission of noise from the circuit for driving the display element to the touch sensor. The conductive layer can also prevent transmission of noise in driving of the touch sensor to the display element, the circuit for driving the display element, or the like. Therefore, the display element and the touch sensor can be driven at the same time or can be driven independently, without taking measures, for example, without preventing influence of noise by driving the display element and the touch sensor at different timings. As a result, a smooth moving image can be displayed by, for example, increasing the drive frequency (also referred to as frame rate) of the display element. Furthermore, the sensing accuracy can be increased by, for example, increasing the drive frequency of the touch sensor. The drive frequency of the display element and the drive frequency of the touch sensor each can be freely set. For example, by providing a period during which one or both of the drive frequencies are set low depending on conditions, power consumption can be reduced.

[Structure Example of Touch Panel Module]

Figure 1B:
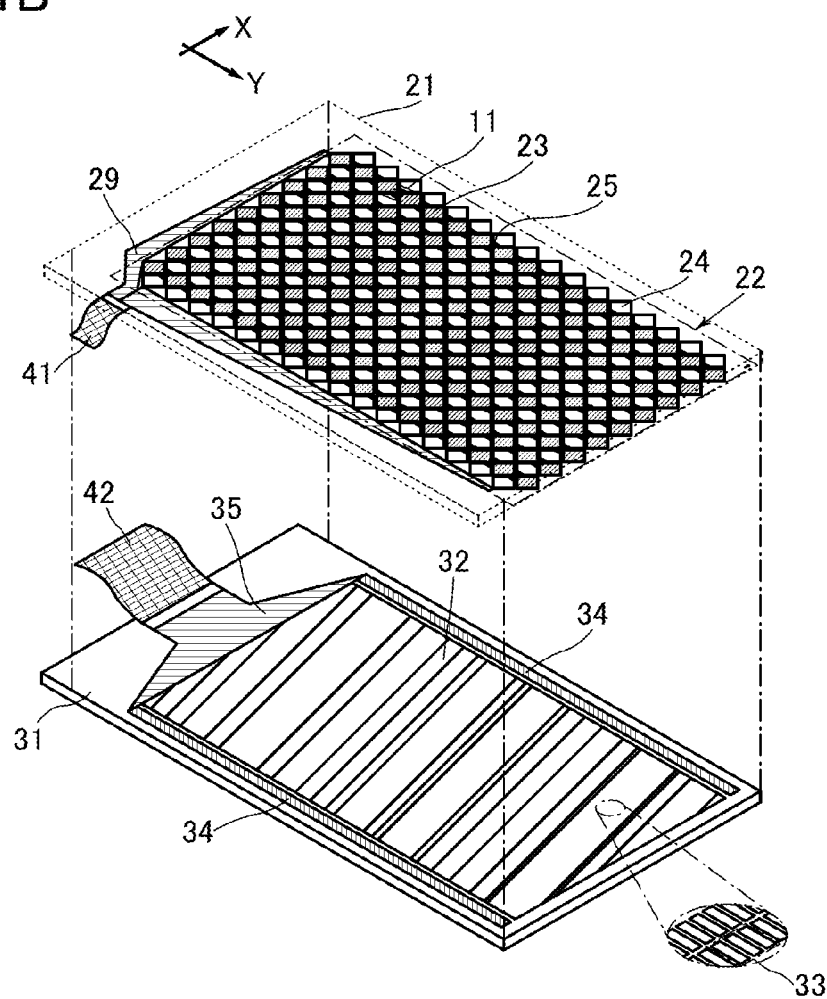

FIG. 1A is a schematic perspective view of a touch panel module 10 of one embodiment of the present invention. FIG. 1B is a schematic perspective exploded view of the touch panel module 10. In the touch panel module 10, a substrate 31 and a substrate 21 are attached to each other. The touch sensor 22 is provided on the substrate 21 side. The substrate 31 is provided with a circuit included in the display panel.

The substrate 21 is provided with a wiring 29 and an FPC 41. The touch sensor 22 is provided on a side of the substrate 21 which faces the substrate 31. The touch sensor 22 includes electrodes 23 to 25, and the like. The wiring 29 electrically connects these electrodes to the FPC 41. The FPC 41 makes it possible to supply an external signal and power to the touch sensor 22 and to output a signal generated in the touch sensor 22 to the outside. Note that a structure without the FPC 41 is referred to as a touch panel module or a touch panel in some cases.

The substrate 21 provided with the touch sensor 22 also can be used alone as a touch sensor substrate or a touch sensor module. For example, such a substrate can be attached to the display surface side of the display panel to form a touch panel.

The touch sensor 22 includes a plurality of electrodes 23, a plurality of electrodes 24, and a plurality of electrodes 25. Each of the electrodes 23 extends in one direction. The plurality of electrodes 23 are arranged in a direction crossing the direction in which each of the electrodes 23 extends. Here, a direction in which each of the plurality of electrodes 23 extends is called a "Y direction," and a direction crossing the Y direction (a direction in which the plurality of electrodes 23 are arranged) is called an "X direction." Each of the plurality of electrodes 24 is positioned between two adjacent electrodes 23. Each of the electrodes 25 electrically connects two electrodes 24 which are adjacent in the X direction to each other. Thus, one conductive layer extending in the X direction is formed using a plurality of electrodes 24 electrically connected to each other by the electrodes 25. There is a region where the electrode 23 and the electrode 25 overlap with each other. An insulating layer is provided between the electrode 23 and the electrode 25.

Capacitance is produced between the electrode 23 and the electrode 24 adjacent to each other. For example, in the case of employing a projected capacitive driving method, one of the electrode 23 and the electrode 24 can be used as a transmission-side electrode, and the other thereof can be used as a reception-side electrode.

Note that a material which can be used for the electrodes 23, 24, and 25 preferably has low resistivity. For example, metal such as silver, copper, or aluminum can be used. A metal nanowire including a number of conductors with an extremely narrow width (for example, a diameter of several nanometers) may be used. Examples of such a metal nanowire include an Ag nanowire, a Cu nanowire, and an Al nanowire. In the case of using an Ag nanowire, light transmittance of 89% or more and a sheet resistance of 40 ohms/square or more and 100 ohms/square or less can be achieved. Wirings and electrodes included in the touch panel module 10 can be formed using such a material. Note that because such a metal nanowire provides high transmittance, the metal nanowire may be used for an electrode of the display element, e.g., a pixel electrode or a common electrode.

A display portion 32, circuits 34, and a wiring 35 are provided over the substrate 31. The wiring 35 is electrically connected to an FPC 42. A signal and power are supplied to the display portion 32 and the circuits 34 from the outside through the FPC 42 and the wiring 35. A plurality of pixels 33 are arranged in a matrix in the display portion 32.

When the display portion 32 performs color display, the pixels 33 include a plurality of subpixels displaying different colors. For example, each of the pixels 33 can include three subpixels (33R, 33G, and 33B) which display different colors. The subpixel 33R, the subpixel 33G, and the subpixel 33B display red, green, and blue, respectively.

The circuits 34 are formed over the substrate 31 through the same process as that of the display portion 32. As the circuits 34, the substrate 31 may be provided with a gate driver circuit, for example. The substrate 31 can also be provided with a source driver circuit. Some circuits for driving the display portion 32 may be incorporated in an IC chip. This IC chip can be mounted on the substrate 31 by a COG method. Alternatively, the FPC, a TAB, a TCP, or the like on which the IC chip is mounted can be attached to the substrate 31.

A substrate having a flat surface can be used for the substrates 21 and 31. The substrate through which light emitted from the display element is extracted is formed using a material that transmits the light. For example, a material such as glass, quartz, ceramics, sapphire, or an organic resin can be used. As the glass, non-alkali glass, barium borosilicate glass, aluminoborosilicate glass, or the like can be used, for example. Examples of materials having flexibility and a light-transmitting property with respect to visible light include glass that is thin enough to have flexibility, polyester resins such as polyethylene terephthalate (PET) and polyethylene naphthalate (PEN), a polyacrylonitrile resin, a polyimide resin, a polymethyl methacrylate resin, a polycarbonate (PC) resin, a polyethersulfone (PES) resin, a polyamide resin, a cycloolefin resin, a polystyrene resin, a polyamide imide resin, a polyvinyl chloride resin, and a polytetrafluoroethylene (PTFE) resin. In particular, a material whose thermal expansion coefficient is low is preferred, and for example, a polyamide imide resin, a polyimide resin, or PET can be suitably used. A substrate in which a glass fiber is impregnated with an organic resin or a substrate whose thermal expansion coefficient is reduced by mixing an organic resin with an inorganic filler can also be used. A substrate using such a material is lightweight, and thus a touch panel using this substrate can also be lightweight.

The weight and thickness of the touch panel can be decreased by using a thin substrate. Furthermore, a flexible touch panel can be obtained by using a substrate that is thin enough to have flexibility.

Since the substrate through which the emitted light is not extracted does not need a light-transmitting property, a metal substrate using a metal material or an alloy material, a ceramic substrate, a semiconductor substrate, or the like can be used as well as the above-mentioned substrates. A metal material and an alloy material, which have high thermal conductivity, are preferable because they can easily conduct heat to the whole sealing substrate and accordingly can prevent a local temperature rise in the touch panel. To obtain flexibility and bendability, the thickness of a metal substrate is preferably greater than or equal to 10 μm and less than or equal to 200 μm, further preferably greater than or equal to 20 µm and less than or equal to 50 µm. Although there is no particular limitation on a material of the metal substrate, aluminum, copper, nickel, a metal alloy such as an aluminum alloy or stainless steel can be used as appropriate, for example.

It is possible to use a substrate subjected to insulation treatment in such a manner that a surface of a conductive substrate is oxidized or an insulating film is formed on the surface. The insulating film may be formed by, for example, a coating method such as a spin-coating method or a dipping method, an electrodeposition method, an evaporation method, or a sputtering method. An oxide film may be formed on the substrate surface by exposure to or heating in an oxygen atmosphere or by an anodic oxidation method or the like.

The flexible substrate may have a stacked-layer structure in which a layer of any of the above-mentioned materials and a hard coat layer (e.g., a silicon nitride layer) which protects a surface of the touch panel from damage or the like, a layer (e.g., an aramid resin layer) which can disperse pressure, or the like are stacked. Furthermore, to suppress a decrease in the lifetime of the display element due to moisture and the like, an insulating film with low water permeability may be provided. For example, a film containing nitrogen and silicon (e.g., a silicon nitride film, a silicon oxynitride film), or a film containing nitrogen and aluminum (e.g., an aluminum nitride film) may be provided.

The substrate may be formed by stacking a plurality of layers. In particular, when a glass layer is used, a barrier property against water and oxygen can be improved and thus a highly reliable touch panel can be provided.

A substrate in which a glass layer, an adhesive layer, and an organic resin layer are stacked in this order can be used, for example. The thickness of the glass layer is greater than or equal to 20 µm and less than or equal to 200 µm, preferably greater than or equal to 25 µm and less than or equal to 100 µm. Such a thickness allows the glass layer to have both a high barrier property against water and oxygen and a high flexibility. The thickness of the organic resin layer is greater than or equal to 10 µm and less than or equal to 200 µm, or preferably greater than or equal to 20 µm and less than or equal to 50 µm. The provision of such an organic resin layer can suppress occurrence of a crack or a break in the glass layer and improve the mechanical strength. With the substrate that includes such a composite material of a glass material and an organic resin, a highly reliable flexible touch panel module 10 can be provided.

The conductive layers in the touch panel module 10 can have a single-layer structure or a stacked-layer structure using any of metals such as aluminum, titanium, chromium, nickel, copper, yttrium, zirconium, molybdenum, silver, tantalum, and tungsten or an alloy containing any of these metals as its main component. For example, it is possible to employ a single-layer structure of an aluminum film containing silicon; a two-layer structure in which an aluminum film is stacked over a titanium film; a two-layer structure in which an aluminum film is stacked over a tungsten film; a two-layer structure in which a copper film is stacked over a copper-magnesium-aluminum alloy film; a two-layer structure in which a copper film is stacked over a titanium film; a two-layer structure in which a copper film is stacked over a tungsten film; a three-layer structure in which a titanium film or a titanium nitride film, an aluminum film or a copper film, and a titanium film or a titanium nitride film are stacked in this order; a three-layer structure in which a molybdenum film or a molybdenum nitride film, an aluminum film or a copper film, and a molybdenum film or a molybdenum nitride film are stacked in this order; or the like. Note that a transparent conductive material containing indium oxide, tin oxide, or zinc oxide may be used. Copper containing manganese is preferably used because controllability of a shape by etching is increased.

As a light-transmitting conductive material, a conductive oxide such as indium oxide, indium tin oxide, indium zinc oxide, zinc oxide, or zinc oxide to which gallium is added, or graphene can be used. Alternatively, a metal material such as gold, silver, platinum, magnesium, nickel, tungsten, chromium, molybdenum, iron, cobalt, copper, palladium, or titanium, or an alloy material containing any of these metal materials can be used. Alternatively, a nitride of the metal material (e.g., titanium nitride) or the like may be used. In the case of using the metal material or the alloy material (or the nitride thereof), the thickness is set small enough to transmit light. Alternatively, a stacked film of any of the above materials can be used as the conductive layer. For example, a stacked film of indium tin oxide and an alloy of silver and magnesium is preferably used because the conductivity can be increased.

As an insulating material used for the touch panel module 10, a resin material such as an acrylic resin, an epoxy resin, a polyimide resin, or a resin having a siloxane bond, and an inorganic insulating material such as silicon oxide, silicon oxynitride, silicon nitride oxide, silicon nitride, or aluminum oxide can be used.

When a liquid crystal panel is used as the display panel, liquid crystal panels in a variety of modes can be used. As the liquid crystal panel, for example, a liquid crystal element using a vertical alignment (VA) mode, a twisted nematic (TN) mode, an in-plane switching (IPS) mode, a fringe field switching (FFS) mode, an axially symmetric aligned microcell (ASM) mode, an optically compensated birefringence (OCB) mode, a ferroelectric liquid crystal (FLC) mode, an antiferroelectric liquid crystal (AFLC) mode, or the like can be used.

Furthermore, a normally black liquid crystal display device, for example, a transmissive liquid crystal display device using a vertical alignment (VA) mode may be used for the touch panel module 10. Some examples are given as the vertical alignment mode; a multi-domain vertical alignment (MVA) mode, a patterned vertical alignment (PVA) mode, or an advanced super view (ASV) mode can be used.

A liquid crystal element is an element that controls transmission and non-transmission of light by the optical modulation action of liquid crystal. Note that optical modulation action of a liquid crystal is controlled by an electric field applied to the liquid crystal (including a horizontal electric field, a vertical electric field, and an oblique electric field). As the liquid crystal used for the liquid crystal element, a thermotropic liquid crystal, a low-molecular liquid crystal, a high-molecular liquid crystal, a polymer dispersed liquid crystal (PDLC), a ferroelectric liquid crystal, an anti-ferroelectric liquid crystal, or the like can be used. Such a liquid crystal material exhibits a cholesteric phase, a smectic phase, a cubic phase, a chiral nematic phase, an isotropic phase, or the like depending on conditions.

As the liquid crystal material, either of a positive liquid crystal and a negative liquid crystal may be used, and an appropriate liquid crystal material can be used depending on the mode or design to be used.

Alternatively, in the case of employing a horizontal electric field mode, a liquid crystal exhibiting a blue phase for which an alignment film is unnecessary may be used. A blue phase is one of liquid crystal phases, which is generated just before a cholesteric phase changes into an isotropic phase while temperature of cholesteric liquid crystal is increased. Since the blue phase appears only in a narrow temperature range, a liquid crystal composition in which several weight percent or more of a chiral material is mixed is used for the liquid crystal layer in order to improve the temperature range. The liquid crystal composition which includes a liquid crystal exhibiting a blue phase and a chiral material has a short response time and has optical isotropy. In addition, the liquid crystal composition which includes a liquid crystal exhibiting a blue phase and a chiral material does not need alignment treatment and has a small viewing angle dependence. An alignment film does not need to be provided and rubbing treatment is thus not necessary; accordingly, electrostatic discharge damage caused by the rubbing treatment can be prevented and defects and damage of the liquid crystal display device in the fabricating process can be reduced.

Figure 2A:
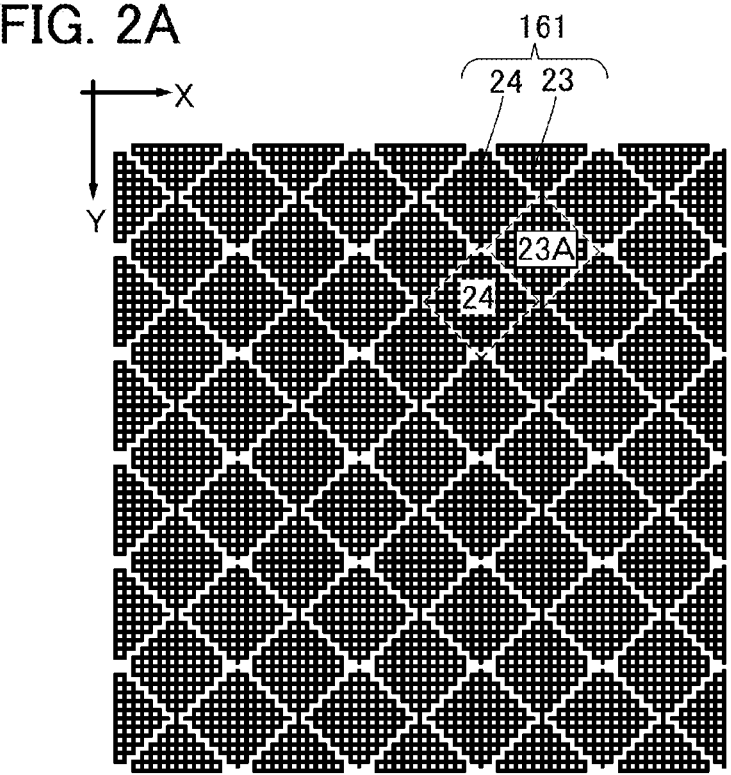
FIGS. 2A and 2B show a structure example of a touch sensor.
Figure 2B:
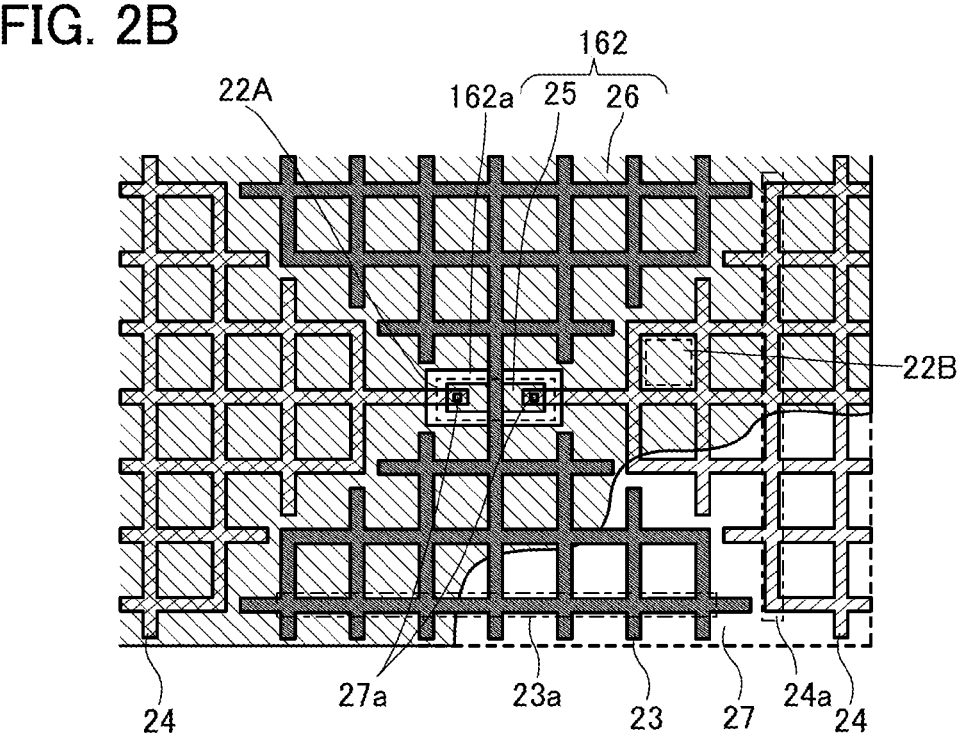

FIGS. 2A and 2B are plan views each illustrating a structure example of a touch sensor. FIG. 2A illustrates a layout example of the electrode 23 and the electrode 24. FIG. 2B is a diagram schematically illustrating an intersection of the electrode 23 and the electrode 25.

The electrode 23 and the electrode 24 are provided on the same insulating surface of the substrate 21. The electrode 23 and the electrode 24 are formed through the same process. A conductive film 161 is formed over the insulating surface and processed, so that these electrodes are formed.

The electrode 23 functions as a Y-direction electrode of the touch sensor 22. The electrode 23 has a structure in which a plurality of electrodes 23A are arranged in the Y direction. The electrode 23A is a square shape, which is formed of a plurality of wirings 23a arranged in a grid. The electrode 24 has a structure similar to that of the electrode 23A and is formed of a plurality of wirings 24a arranged in a grid. An X-direction electrode of the touch sensor 22 is formed of a plurality of electrodes 24a which are connected by the plurality of electrodes 25.

The electrode 23 and the electrode 24 each can be called a square mesh electrode (a net-like electrode). Such a structure of the electrode 23 and the electrode 24 enables an image displayed on the display portion 32 to be seen through the touch sensor 22. Therefore, a conductive film with low resistance such as a metal, an alloy, a metal compound, and the like can be used for the conductive film 161 because the electrode 23 and the electrode 24 do not necessarily need to have a light-transmitting property.

Each of the wiring 23a and the wiring 24a can have a width of greater than or equal to 50 nm and less than or equal to 100 µm. T width is preferably greater than or equal to 1 µm and less than or equal to 50 µm, further preferably greater than or equal to 1 µm and less than or equal to 20 µm. The widths of the wiring 23a and the wiring 24a are thus made narrower; accordingly, an interval between the pixels 33 in the display portion 32 can be shortened, so that the aperture ratio of the display portion 32 is improved. Therefore, the display portion 32 can have higher resolution. The aperture ratio of the electrode 23 (proportion of aperture area per unit area in the electrode 23) can be higher than or equal to 20% and lower than 100%. The aperture ratio is preferably higher than or equal to 30% and lower than 100%, further preferably higher than or equal to 50% and lower than 100%. The same can be said for the electrode 24.

An insulating layer 27 covering the electrodes 23 and 24 is provided. The electrode 25 and an electrode 26 are formed over the insulating layer 27. The electrode 25 and the electrode 26 are formed through the same process. A conductive film 162 is formed over the insulating layer 27. Then, the conductive film 162 is partly removed to form a plurality of openings 162a. Thus, the plurality of electrodes 25 are formed as against one electrode 26.

The conductive film 162 is a film with light-transmitting property because the electrode 25 and the electrode 26 overlap with the display region of the pixel 33. Therefore, the conductive film 162 can be formed using a conductive metal oxide such as indium oxide, indium tin oxide, indium zinc oxide, zinc oxide, or zinc oxide to which gallium is added. A metal oxide which is called an oxide semiconductor such as an In—Zn—Ga oxide can be used for the conductive film 162 when its resistance is reduced.

A metal oxide which can be used for the conductive film 162 is a material whose resistivity can be controlled by oxygen vacancies and/or the concentration of impurities such as hydrogen or water in the film. Examples of such a metal oxide include an In-M-Zn oxide (M is a metal such as Al, Ti, Ga, Ge, Y, Zr, Sn, La, Ce, or Hf). A treatment for increasing oxygen vacancies and/or the impurity concentration in the metal oxide can reduce the resistivity of the metal oxide. When the conductive film 162 is formed of the metal oxide, for example, the concentration of hydrogen in the conductive film 162 is $8\times10^{19}$ atoms/cm$^3$ or higher, preferably $1\times10^{20}$ atoms/cm$^3$ or higher, further preferably $5\times10^{20}$ atoms/cm$^3$ or higher.

Hydrogen, boron, phosphorus, or nitrogen is injected into the metal oxide by an ion implantation method, an ion doping method, a plasma immersion ion implantation method, or the like, so that the resistivity of the metal oxide can be reduced.

Alternatively, a metal oxide film with low resistance can be formed in such a manner that an insulating film capable of releasing hydrogen (typically, a silicon nitride film) is formed in contact with the metal oxide film and then subjected to heat treatment. This is because the insulating film can supply hydrogen to the metal oxide film. The insulating film capable of releasing hydrogen preferably has a hydrogen concentration of $1\times10^{22}$ atoms/cm$^3$ or higher in the film. Such an insulating film is formed in contact with the metal oxide film, whereby hydrogen can be effectively contained in the metal oxide film.

Hydrogen contained in the metal oxide film reacts with oxygen bonded to a metal atom to form water, and in addition, an oxygen vacancy is formed in a lattice from which oxygen is released (or in a portion from which oxygen is released). Due to entry of hydrogen into the oxygen vacancy, an electron serving as a carrier is generated in some cases. Furthermore, in some cases, bonding of part of hydrogen to oxygen bonded to a metal atom causes generation of an electron serving as a carrier. Therefore, the metal oxide film provided in contact with the insulating film containing hydrogen can have a higher carrier density than a metal oxide film which is not in contact with an insulating film containing hydrogen.

In addition, plasma treatment can reduce the resistance of the metal oxide film. As an example of the plasma treatment, plasma treatment using a gas containing one or more of a rare gas (He, Ne, Ar, Kr, or Xe), hydrogen, and nitrogen can be given. Specifically, plasma treatment in an Ar atmosphere, plasma treatment in a mixed gas of Ar and hydrogen, plasma treatment in an ammonia atmosphere, plasma treatment in a mixed gas of Ar and ammonia, plasma treatment in a nitrogen atmosphere, or the like can be used.

In the metal oxide film subjected to the above plasma treatment, an oxygen vacancy is formed in a lattice from which oxygen is released (or in a portion from which oxygen is released). This oxygen vacancy can cause carrier generation. Furthermore, when hydrogen is supplied from an insulating film that is in the vicinity of the metal oxide film, specifically, that is in contact with the lower surface or the upper surface of the metal oxide film, hydrogen is bonded to the oxygen vacancy, so that an electron serving as a carrier is generated in some cases.

Openings 27a are provided in the insulating layer 27 to connect the electrode 24 to the electrode 25. Through a pair of openings 27a, the electrode 25 electrically connects two adjacent electrodes 24. The electrode 26 can serve as a common electrode of the counter substrate side of the display panel.

Figure 3:
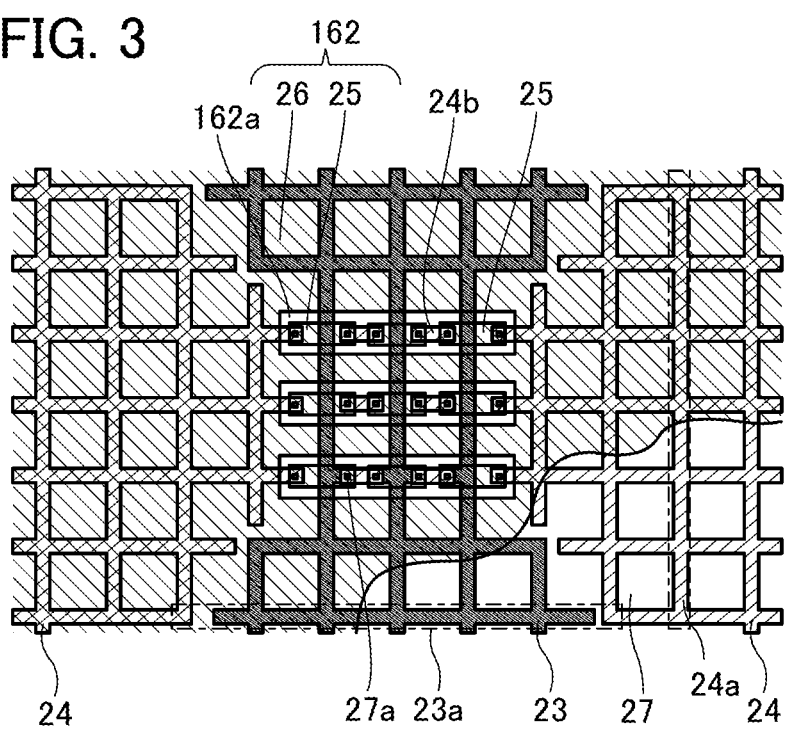
FIG. 3 shows a structure example of a touch sensor.

In the example of FIG. 2B, one of the wirings 24a in each of the electrodes 24 is provided with a connection portion which connects the electrode to one adjacent electrode 24; however, a plurality of wirings 24a may be provided with connection portions which connect the electrode to the adjacent electrode 24. FIG. 3 shows an example in which three wirings 24a are provided with connection portions. In the example of FIG. 3, two electrodes 24 are connected to each other by two interconnection wirings 24b and three electrodes 25 provided with one of wirings 24a. The interconnection wirings 24b are formed through the same process as that of the electrodes 23 and 24.

Figure 4A:
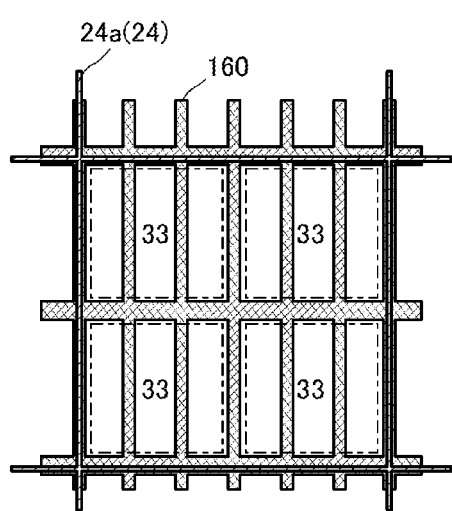
FIGS. 4A and 4B show layout examples of a touch sensor, a color filter, and a black matrix.
Figure 4B:
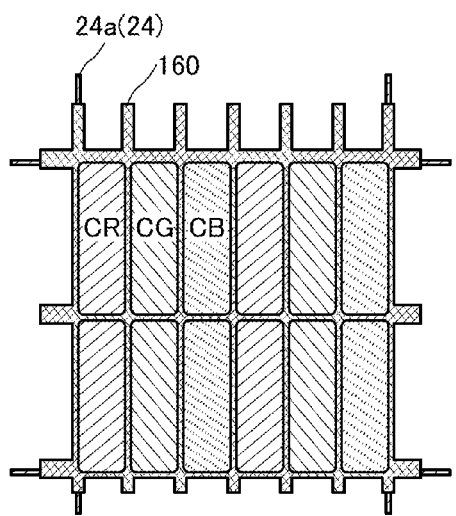

The substrate 21 is provided with a color filter and a black matrix. The black matrix is one kind of light-blocking layer and provided for preventing color mixing between subpixels. A layout of the electrode 24, the color filter, and the black matrix (BM) is described with reference to FIGS. 4A and 4B. Note that the layout of the electrode 23 is the same as that of the electrode 24. FIG. 4A is a schematic view of a layout example of the electrode 24 and the black matrix, and FIG. 4B is a schematic view of a layout example of the black matrix and the color filter. FIGS. 4A and 4B illustrate a lattice portion formed using four wirings 24a.

The electrode 24 has a lattice shape, and a BM 160 also has a lattice shape. The pixels 33 are provided in two rows and two columns in a region surrounded by four wirings 24a. Each of the pixels 33 is formed of three subpixels. Each of the wirings 24a of the electrode 24 is provided to lie on the BM 160 in order that the aperture ratio of the pixel 33 should not be reduced. A layer CR, a layer CG, and a layer CB are provided in openings in the BM 160. The layer CR, the layer CG, and the layer CB are coloring layers serving as a color filter. The layer CR, the layer CG, and the layer CB are coloring layers of red, green, and blue, respectively.

Note that the order in which the electrode 24, the BM 160, and the color filter are stacked can be set as appropriate. For example, the BM 160, the color filter, and the electrode 24 can be stacked in this order from the substrate 21 side. Alternatively, the BM 160, the electrode 24, and the color filter can be stacked in this order.

Although the three subpixels included in the pixel 33 are the same area (the area of the openings in the BM 160), the subpixels may be different in area. For example, blue has a comparatively low spectral luminous efficacy and the area of the layer CB may be the largest. Alternatively, red and green have a comparatively high spectral luminous efficacy and the area of the layer CR or the layer CG can be small.

In addition, the number of subpixels included in the pixel 33 is not limited to three. The number of the subpixels can be four, for example. In this case, a subpixel displaying white or yellow can be added to the three subpixels displaying RGB.

Device structures of the touch panel module 10 are described below with reference to FIG. 5 to FIG. 10.

Examples in which a display panel of the touch panel module 10 is a liquid crystal panel of a fringe field switching (FFS) mode are given here.

<Structure Example 1>

FIG. 5 is a cross-sectional schematic view of the touch panel module 10. The touch panel module 10 in FIG. 5 is called a "touch panel module 10-1," here.

FIG. 5 illustrates a cross-sectional structure of a region including an FPC 42, a region including a circuit 34, a region including a display portion 32 and a touch sensor 22, a region including an FPC 41, and the like. FIG. 5 also illustrates a cross-sectional structure of portions 22A and 22B of the touch sensor 22. The portion 22A is a portion where two electrodes 24 are connected to each other by the electrode 25, and the portion 22B is an opening in the electrode 24.

It is supposed that the pixel 33 is formed of the three subpixels (33R, 33G, and 33B). FIG. 5 illustrates a cross-sectional structure of the subpixel 33R. The subpixel 33R includes a transistor Q1, a capacitor C1, a liquid crystal element LC1, and the layer CR. The same can be said for the subpixels 33G and 33B.

The substrate 21 and the substrate 31 are attached to each other with an adhesive layer 141. The liquid crystal layer 150 is sealed in a region surrounded by the substrate 21, the substrate 31, and the adhesive layer 141. Note that the substrate 21 and the substrate 31 may each be provided with an alignment film for controlling an alignment of the liquid crystal layer 150.

Although the circuit 34 includes a region overlapping with the liquid crystal layer 150 here, the adhesive layer 141 can be provided so that the circuit 34 does not overlap with the liquid crystal layer 150. For the adhesive layer 141, a curable resin such as a heat curable resin, a photocurable resin, or a two-component curable resin can be used. For example, an acrylic resin, a polyurethane, an epoxy resin, or a resin having a siloxane bond can be used.

Insulating layers such as insulating layers 210 to 215 and conductive layers such as conductive layers 151, 152, and 220 to 222, and semiconductor layers 155 are provided over the substrate 31. Here, a plurality of conductive layers obtained by processing the same conductive film are denoted by the same reference numeral in some cases. The number of the conductive films included in each conductive layer may be one or two. The same can be said for the insulating layers and the semiconductor layers.

Transistors such as transistors Q1 to Q3 are provided over the insulating layer 210. The transistor Q1 is a switching transistor for driving the liquid crystal element LC1. The transistor Q1 is an n-channel transistor. The transistors Q2 and Q3 are transistors included in the circuit 34. The transistor Q2 is an n-channel transistor and the transistor Q3 is a p-channel transistor. Here, the transistor Q2 and the transistor Q3 are electrically connected to each other in series and serve as an inverter.

The conductive layers 220 to 222 serve as electrodes, wirings, or the like of a circuit included in the liquid crystal panel. For example, each of gate electrodes of transistors Q1 to Q3 is formed using a stack of the conductive layer 220 and the conductive layer 221. Their source electrodes and drain electrodes are formed using the conductive layer 222.

The semiconductor layers 155 of the transistors Q1 to Q3 are formed using a semiconductor film. Regarding the crystallinity, this semiconductor film is amorphous, microcrystalline, polycrystalline, or single crystal. A semiconductor material for the semiconductor layers 155 is not particularly limited; for example, a semiconductor material formed of a Group 14 element (silicon, germanium, silicon carbide, Si—Ge), a compound semiconductor, a metal oxide (oxide semiconductor), or the like can be given.

The semiconductor layers 155 can be formed using a polycrystalline silicon film obtained in such a manner that an amorphous silicon film is formed and then crystallized, for example. Examples of a crystallization method of an amorphous silicon film include a laser crystallization method in which a laser having a wavelength of less than or equal to 400 nm is used, a lamp annealing crystallization method using infrared light, a solid phase growth method by heat treatment at 400° C. to 600° C., and a high-temperature annealing crystallization method at approximately 950° C. In a solid phase growth method, a catalytic element such as nickel is added to an amorphous silicon film, and then heat treatment is performed. Alternatively, the amorphous silicon film may be crystallized by a plurality of crystallization methods. For example, a polycrystalline silicon film is obtained in such a manner that a catalytic element such as nickel is added and a solid phase growth is caused by heat treatment, and then this polycrystalline silicon film is irradiated with a laser beam so that defects in the polycrystalline silicon film are decreased.

The semiconductor layers 155 can be formed using a single crystal (or polycrystalline) silicon film which is formed of a surface portion separated from a single crystal (or polycrystalline) silicon wafer to which hydrogen ions or the like are injected.

The semiconductor layers 155 of the transistor Q2 is provided with one channel formation region 180, two low concentration impurity regions 181, and two high concentration impurity regions 182. The low concentration impurity regions 181 and the high concentration impurity regions 182 are n-type regions, and boron (B), aluminum (Al), gallium (Ga), or the like is added thereto. The low concentration impurity region 181 is also referred to as an LDD (lightly doped drain) region. The high concentration impurity regions 182 serve as a source region and a drain region.

The semiconductor layers 155 of the transistor Q3 is not provided with LDD regions. The semiconductor layers 155 is provided with one channel formation region 190, and two high concentration impurity regions 192. The high concentration impurity regions 192 are p-type regions, and phosphorus (P), arsenic (As), or the like is added thereto. The high concentration impurity regions 192 serve as a source region and a drain region.

The transistor Q1 is a transistor of multi-channel structure including a plurality of channel formation regions in one semiconductor layer. Corresponding to the gate electrodes, two channel formation regions 180, four low concentration impurity regions 181, and three high concentration impurity regions 182 are formed in the semiconductor layers 155. The multi-channel structure can reduce the leakage current of the transistor Q1 in an off state.

The end portion of the substrate 31 is provided with a terminal 243 formed using the conductive layer 222 and the conductive layer 151. The terminal 243 is electrically connected to the FPC 42 by a conductive layer 242.

A pixel electrode PIX (hereinafter referred to as an "electrode PIX") is provided in every subpixel, and is electrically connected to the transistor Q1. The electrode PIX has a comb-like top shape or a planar shape with slits. The electrode PIX is formed using the conductive layer 151. The conductive layer 151 is formed of a material which transmits visible light.

An electrode COM is formed of one conductive layer 152 in the display portion 32. The electrode COM may also be divided into parts corresponding to the electrodes PIX and the subpixels. In this case, a wiring may be provided in a column direction (or a row direction), and the electrodes COM in the same column (or row) may be electrically connected to this wiring. Also the electrode COM may have a comb-like portion or a portion provided with slits like the electrode PIX.

The liquid crystal element LC1 is formed using the electrodes PIX and COM, and the liquid crystal layer 150. The capacitor C1 is formed in a part where the electrode PIX overlaps with the electrode COM with the insulating layer 215 therebetween. The conductive layer 152 formed of a material which reflects visible light provides a reflective liquid crystal panel. The conductive layer 152 formed of a material which transmits visible light provides a transmissive liquid crystal panel.

The substrate 21 is provided with the touch sensor 22, a color filter, the BM 160, a spacer 185, and the like. The substrate 21 can be provided with a substrate with which an object, such as a finger or a stylus, is to be in direct contact. Note that the substrate 21 provided with the touch sensor 22 also can be used alone as a touch sensor substrate or a touch panel module. For example, such a substrate can be attached to the display surface side of the display panel to form a touch panel. The counter substrate (the substrate 21) included in the liquid crystal panel is provided with the touch sensor 22 in this embodiment; therefore, a thinner and lightweight touch panel module 10-1 can be provided.

In the example of FIG. 5, the color filter and the BM 160 are provided in the same layer. In a portion provided with the BM 160, at least two coloring layers serving as the color filter are stacked here; the layer CR and the layer CB are stacked here. In a portion provided with the color filter, any one of the layer CR, the layer CB, and the layer CG is provided in accordance with the display color of the subpixel. Note that also the portion 22B includes a region where the color filter is not provided and the BM 160 is provided as the structure example of FIG. 4B.

Here, the layer CR is provided. Such a structure of the color filter and the BM 160 can reduce the number of kinds of materials used for the fabrication. Note that the BM 160 can also be formed using a metal layer or a coloring layer containing carbon black. These layers with conductivity influence operation of the touch sensor 22. Therefore, the BM 160 is preferably formed of a non-conductive layer such as a coloring layer for a color filter as described in this embodiment because the detection sensitivity of the touch sensor 22 can be improved.

An insulating layer 121 covering the layer CR, the layer CB, and the layer CG is provided. The insulating layer 121 is provided with the electrodes 23 and 24. An insulating layer 122 covering the electrodes 23 and 24 is provided. The insulating layer 122 corresponds to the insulating layer 27 in FIG. 2B. The insulating layer 122 is provided with the electrodes 25 and 26. Insulating layers 130 and 123 covering the electrodes 25 and 26 are provided. The insulating layer 123 is provided with the spacer 185.

The insulating layer 121 has a function of an overcoat preventing impurities such as a pigment included in the layer CR, the layer CB, or the layer CG from diffusing into the liquid crystal layer 150. The insulating layers 122 and 123 function as planarization layers. The insulating layers 121 to 123 are formed of a resin material such as an acrylic resin. Here, the electrodes 25 and 26 are formed by processing a low resistance metal oxide film. The insulating layer 130 is provided so as to reduce the resistance of the metal oxide film. The insulating layer 130 is a silicon nitride layer capable of releasing hydrogen, for example.

The electrode 26 is supplied with an appropriate constant potential. For example, the electrode 26 and the electrode COM may have the same potential, which reduces components of a perpendicular direction (a longitudinal direction) to the substrate 21 surface in the electric field formed in the liquid crystal layer 150, so that defective alignment of the liquid crystal layer 150 can be reduced. In addition, inversion driving can reduce a residual DC (direct-current) voltage generated in the liquid crystal element LC1, which leads to suppression of flickers. Therefore, the display quality of the touch panel module 10-1 can be improved. In addition, the electrode 26 can function as a shielding layer which shields the display portion 32 from noise occurring in the touch sensor 22 and can function as a shielding layer which shields the touch sensor 22 from noise occurring in the display portion 32. In addition, the detection sensitivity of the touch panel module 10-1 can be increased.

An end portion of the substrate 21 is provided with a wiring 29. The wiring 29 is electrically connected to the FPC 41 by the electrode 28 and the conductive layer 241. The wiring 29 is formed through the same process as that of the electrodes 23 and 24. The electrode 28 is formed through the same process as that of the electrodes 25 and 26. As the conductive layer 241, an anisotropic conductive film (ACF), an anisotropic conductive paste (ACP), or the like can be used, and the same can be said for the conductive layer 242.

Other structure examples of the touch panel module 10 are described below. The BM 160 and the color filter are formed in different layers in these structure examples.
<Structure Example 2>

Figure 6:
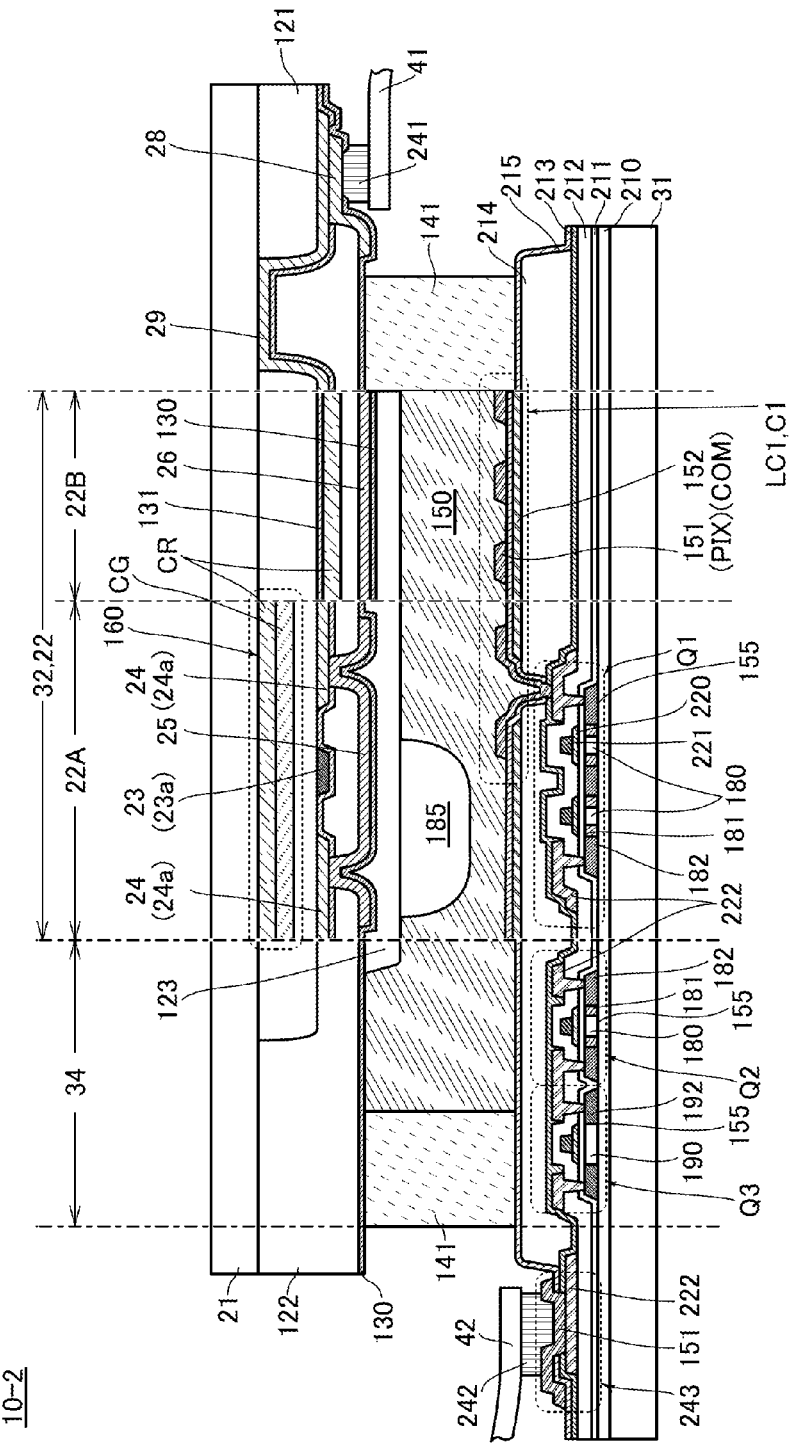
FIG. 6 is a cross-sectional view illustrating a structure example of a touch panel module.

In a touch panel module 10-2 in FIG. 6, the electrodes 23 and 24 are formed, and then the color filter is provided. An insulating layer 131 covering the insulating layer 121 and the electrodes 23 and 24 is provided. The insulating layer 131 is provided with a coloring layer serving as a color filter. Any one of the layer CR, the layer CB, and the layer CG is provided in accordance with the display color of the subpixel. The insulating layer 122 covering the color filter is provided. The insulating layer 122 is provided with the electrodes 25 and 26. Note that the insulating layer 131 is not necessarily provided and the electrodes 23 and 24 may be provided with a color filter.
<Structure Example 3>

Figure 7:
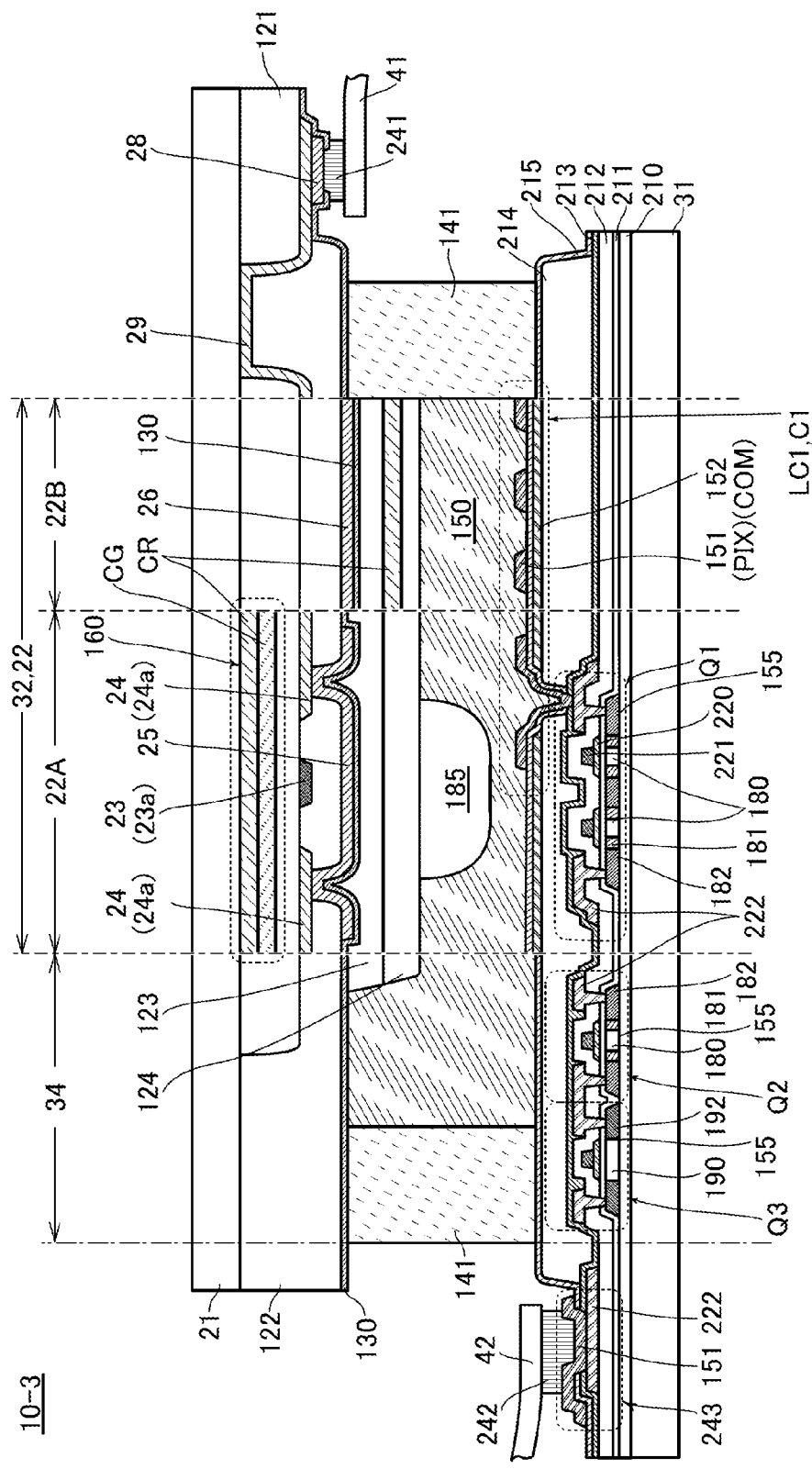
FIG. 7 is a cross-sectional view illustrating a structure example of a touch panel module.

In a touch panel module 10-3 in FIG. 7, the electrodes 25 and 26 are provided with a color filter therebelow. Specifically, the insulating layer 123 is provided with a coloring layer serving as a color filter. The insulating layer 122 in the portion 22B is provided with any one of the layer CR, the layer CB, and the layer CG in accordance with the display color of the subpixel. An insulating layer 124 covering the color filter is provided.
<Structure Example 4>

Figure 8:
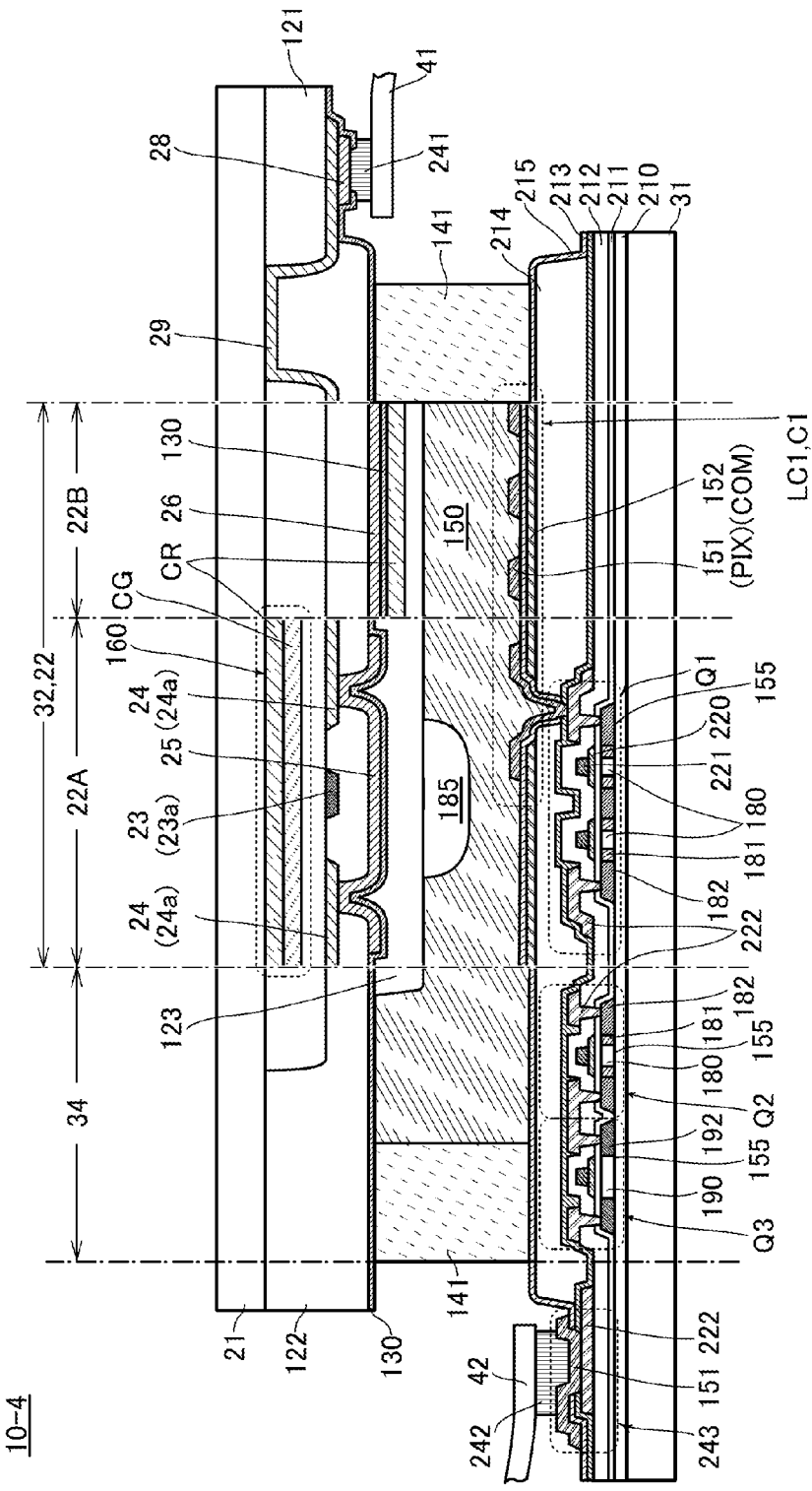
FIG. 8 is a cross-sectional view illustrating a structure example of a touch panel module.

In a touch panel module 10-4 in FIG. 8, which is a modification example of the touch panel module 10-3, the insulating layer 130 is provided with a coloring layer serving as a color filter. The insulating layer 130 is provided with any one of the layer CR, the layer CB, and the layer CG in accordance with the display color of the subpixel. The insulating layer 123 covering the color filter and the electrodes 25 and 26 is provided. Note that there is a region which is not provided with a color filter even in the portion 22B.
<Structure Example 5>

Figure 9:
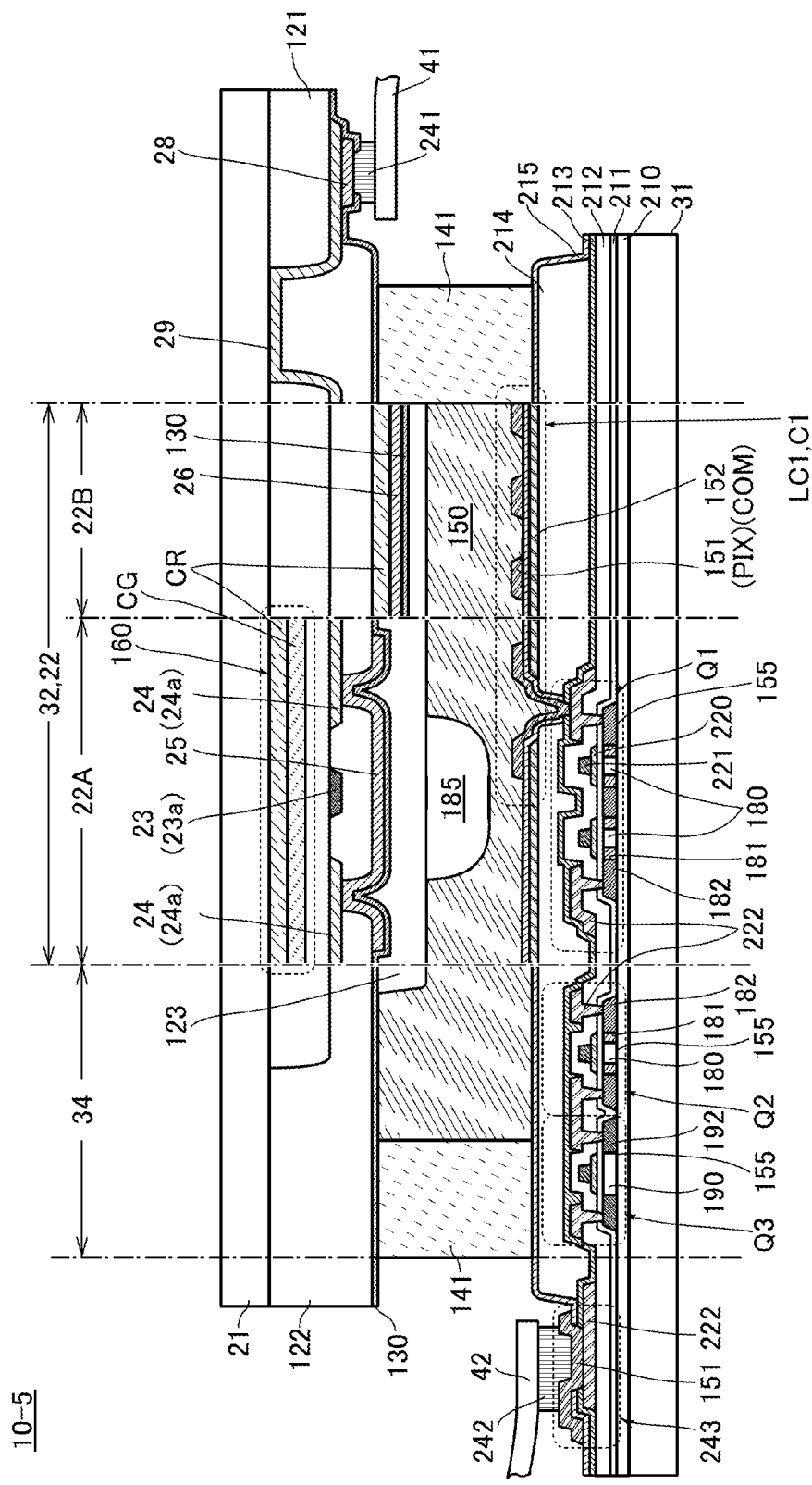
FIG. 9 is a cross-sectional view illustrating a structure example of a touch panel module.

In a touch panel module 10-5 in FIG. 9, color filters are formed before the electrodes 25 and 26 are formed. The insulating layer 122 is provided with the color filter. The insulating layer 122 is provided with any one of the layer CR, the layer CB, and the layer CG in accordance with the display color of the subpixel. In the portion 22A, the insulating layer 122 is provided with the electrode 25. In the portion 22B, the layer CR is provided with the electrode 26. Note that the electrode 26 is in contact with the top surface of the insulating layer 122 in a region in the portion 22B which is not provided with a color filter.
<Structure Example 6>

Figure 10:
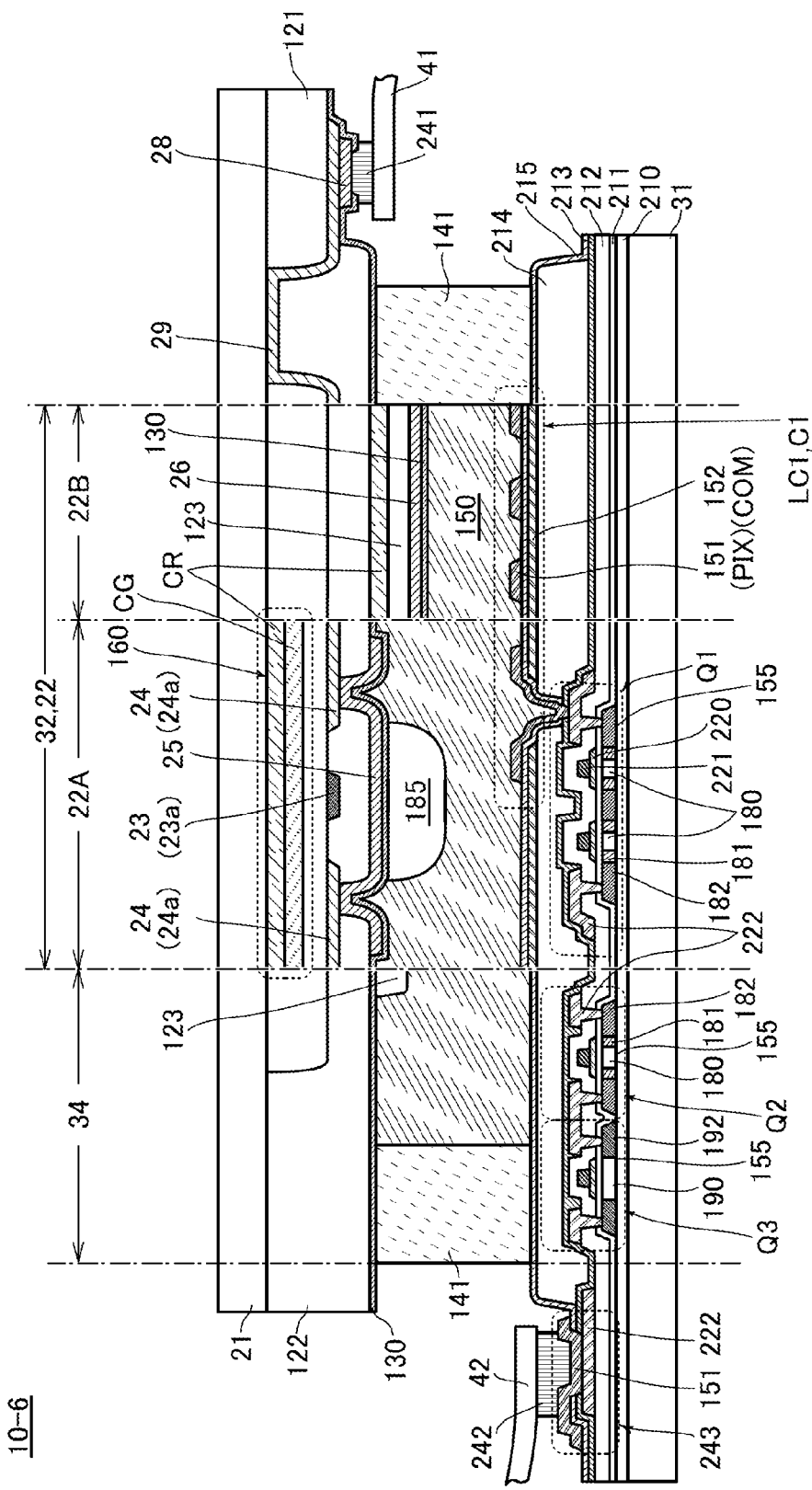
FIG. 10 is a cross-sectional view illustrating a structure example of a touch panel module.

In a touch panel module 10-6 in FIG. 10, color filters are formed before the electrodes 25 and 26 are formed as in the touch panel module 10-5. The touch panel module 10-6 is different from the touch panel module 10-5 in that the electrodes 25 and 26 are formed after the insulating layer 123 is formed. The insulating layer 123 of a portion provided with the electrode 25 is removed. That is, the insulating layer 122 in an opening of the insulating layer 123 is provided with the electrode 25, and the insulating layer 123 is provided with the electrode 26.

Note that when the electrodes 25 and 26 are formed of the above-described conductive oxide such as indium tin oxide or zinc oxide in the above structure examples 1 to 6, the insulating layer 130 is not necessarily provided.

Embodiment 2

In this embodiment, a transistor which can be used in the touch panel module 10 is described.

Structure examples of an n-channel transistor using a thin polycrystalline silicon (polysilicon) film is described with reference to FIGS. 11A to 11C, FIGS. 12A to 12C, FIGS. 13A to 13C, FIGS. 14A to 14C, FIGS. 15A to 15C, and FIGS. 16A and 16B.

Figure 11A:
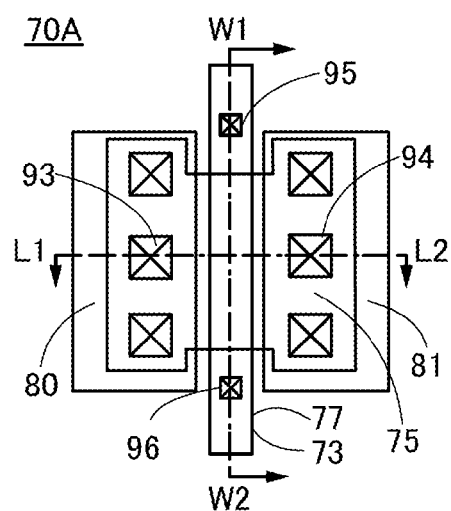
FIGS. 11A to 11C are a top view and cross-sectional views illustrating a structure example of a transistor.
Figure 11C:
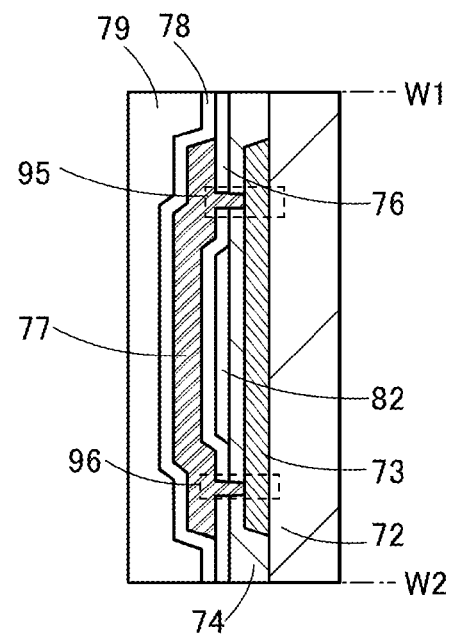
Figure 11B:
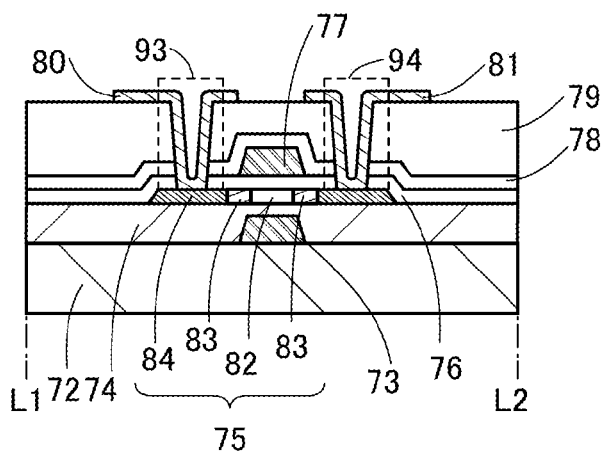

FIG. 11A is a top view of a transistor 70A. FIG. 11B is a cross-sectional view along line L1-L2 in FIG. 11A. FIG. 11C is a cross-sectional view along line W1-W2 in FIG. 11A. Note that FIG. 11B is a cross-sectional view of the transistor 70A in the channel length L direction. FIG. 11C is a cross-sectional view of the transistor 70A in the channel width W direction.

The transistor 70A includes, over a substrate 72 having an insulating surface, a conductive layer 73 functioning as a gate, an insulating layer 74 over the conductive layer 73, a semiconductor layer 75 overlapping with the conductive layer 73 with the insulating layer 74 provided therebetween, an insulating layer 76 over the semiconductor layer 75, a conductive layer 77 functioning as a gate and overlapping with the semiconductor layer 75 with the insulating layer 76 provided therebetween, an insulating layer 78 over the conductive layer 77, an insulating layer 79 over the insulating layer 78, and a conductive layer 80 and a conductive layer 81 functioning as a source electrode and a drain electrode and electrically connected to the semiconductor layer 75 through openings provided in the insulating layers 78 and 79.

The semiconductor layer 75 includes a channel formation region 82 overlapping with the conductive layer 77, a pair of LDD regions 83 between which the channel formation region 82 is sandwiched, and a pair of impurity regions 84 between which the channel formation region 82 and the LDD regions 83 are sandwiched. The pair of impurity regions 84 function as a source region and a drain region. An impurity element imparting n-type conductivity, such as phosphorus (P) or arsenic (As), is added to the LDD regions 83 and the impurity regions 84.

The transistor 70A includes a first insulating layer (the insulating layer 74) over a first conductive layer (the conductive layer 73), the semiconductor layer 75 including the channel formation region 82 over the first insulating layer (the insulating layer 74), a second insulating layer (the insulating layer 76) over the semiconductor layer 75, and a second conductive layer (the conductive layer 77) over the second insulating layer (the insulating layer 76). The second conductive layer (the conductive layer 77) covers a side of the semiconductor layer 75 with the second insulating layer (the insulating layer 76) provided therebetween. The semiconductor layer 75 is surrounded by the first conductive layer (the conductive layer 73) and the second conductive layer (the conductive layer 77) in a cross section in the channel width direction; that is, the semiconductor layer 75 has an s-channel structure.

In the s-channel structure, current flows through the whole (bulk) of the semiconductor layer 75. Since current flows in an inner part of the semiconductor layer 75, the current is hardly affected by interface scattering, and high on-state current can be obtained. Note that as the semiconductor layer 75 is thicker, the on-state current can be increased.

When the transistor has the s-channel structure, the effect that the influence due to impurities entering the semiconductor layer 75 from above and below can be avoided is provided. The first conductive layer (the conductive layer 73) and the second conductive layer (the conductive layer 77) can block the light irradiation of the semiconductor film from above and below and suppress photoexcitation, so that the off-state current can be prevented from increasing.

Although an example of an n-channel transistor is described here, a p-channel transistor can be fabricated if an impurity element which imparts a p-type conductivity, such as boron (B), aluminum (Al), or gallium (Ga) is added instead of the impurity element which imparts an n-type conductivity to the semiconductor layer 75. A slight amount of the impurity element which imparts a p-type conductivity may be added to the channel formation region 82 of the n-channel transistor 70A.

Note that the semiconductor layer 75 may be crystallized by various techniques. Examples of the various techniques of crystallization are a laser crystallization method using a laser beam and a crystallization method using a catalytic element. Alternatively, a crystallization method using a catalytic element and a laser crystallization method may be combined. In the case of using a high heat resistant substrate such as quartz as the substrate 72, any of the following crystallization methods can be used in combination: a thermal crystallization method with an electrically-heated oven, a lamp annealing crystallization method with infrared light, a crystallization method with a catalytic element, and high temperature annealing at about 950° C.

The amorphous silicon film is irradiated with a laser beam and changed into a polycrystalline silicon film, and the polycrystalline silicon film is used as the channel formation region 82 of the transistor 70A. In this case, a larger amount of current flows through the bulk of the semiconductor film than through the interface of the semiconductor film because grain boundaries formed by the laser beam irradiation reach below the polycrystalline silicon film. Therefore, the influence due to variations of laser beam irradiation energy can be decreased.

A threshold value is conventionally controlled by addition of a low-concentration impurity elements to a channel formation region. When a semiconductor layer is sandwiched between a pair of gate electrodes, carriers are likely to be produced at an interface between the semiconductor layer and the insulating layer. The carriers are injected into the insulating layer or the interface between the insulating layer and the semiconductor layer, and there is a problem in that the threshold value increases. According to the energy band structure of this channel formation region, the carriers have a path only in the vicinity of the interface between the semiconductor layer and the insulating layer. Therefore, a decrease in the mobility or the drain current due to injection of hot carriers which are accelerated by voltage applied to the drain into the interface between the insulating layer and the semiconductor layer or into the insulating layer is a big problem.

In the transistor 70A, a gate electric field is applied to the semiconductor film not only in the perpendicular direction but also in the side surface directions. That is, the gate electric field is applied to the whole of the semiconductor film, whereby current flows in the bulk of the semiconductor film. Consequently, the field-effect mobility of the transistor can be increased. Variations of impurities also influence the whole of the bulk; therefore, a change in the electrical characteristics can be suppressed.

Although the transistor 70A includes the conductive layer 77 functioning as a gate and the conductive layer 73 functioning as a back gate, another structure can be used. For example, a transistor without the conductive layer 73 functioning as a back gate may be partly provided depending on circuits to be used.

The conductive layer 77 functioning as a gate is tapered. When an impurity region is formed in a self-aligned manner by doping the semiconductor layer with an impurity element with the use of the tapered gate electrode, a semiconductor device in which hot-carrier degradation is not likely to occur can be provided.

Figure 12A:
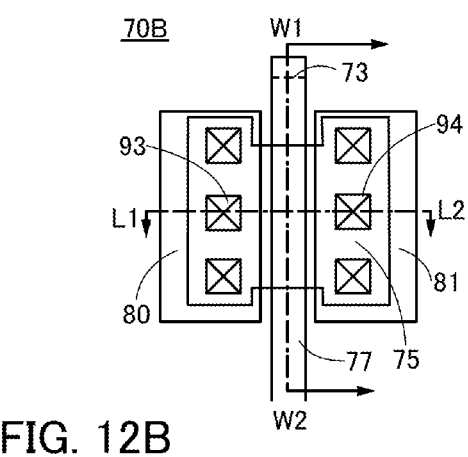
FIGS. 12A to 12C are a top view and cross-sectional views illustrating a structure example of a transistor.
Figure 12C:
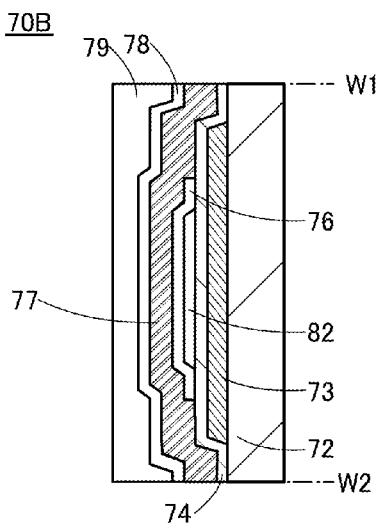
Figure 12B:
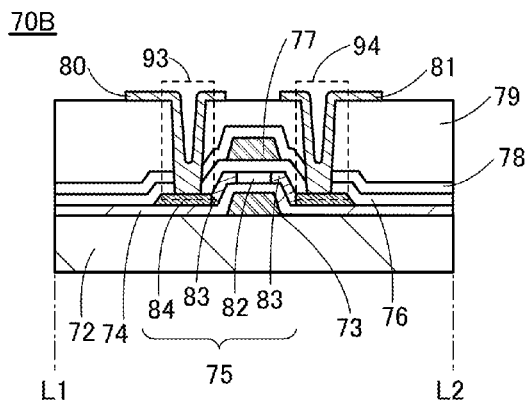

Although the conductive layer 77 functioning as a gate is electrically connected to the conductive layer 73 functioning as a back gate in the transistor 70A, different potentials may be applied to them. Such an example is illustrated in FIGS. 12A to 12C. FIG. 12A is a top view of a transistor 70B. FIG. 12B is a cross-sectional view along line L1-L2 in FIG. 12A. FIG. 12C is a cross-sectional view along line W1-W2 in FIG. 12A.

The transistor 70B in FIGS. 12A to 12C is different from the transistor 70A in the kind of the insulating layer 74. An insulating film obtained by a plasma CVD method is used as the insulating layer 74 in the transistor 70B. There is a convex portion on the insulating film surface formed due to the existence of the conductive layer 73 functioning as a back gate, and the semiconductor film is formed thereover; thus, the semiconductor film surface also has a convex reflecting to the surface shape thereunder.

A channel formation region of the transistor 70B also has an s-channel structure, in which a channel formation region is surrounded by the conductive layer 77 functioning as a gate and the conductive layer 73 functioning as a back gate.

Figure 13A:
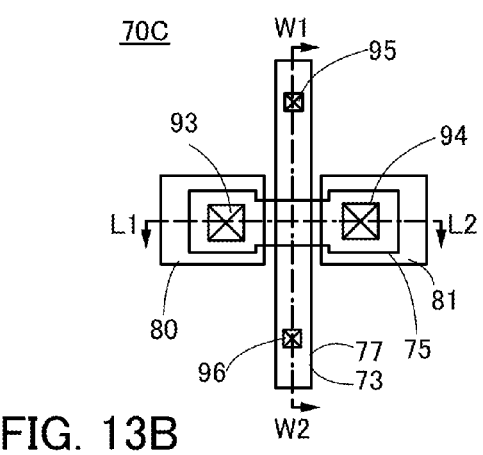
FIGS. 13A to 13C are a top view and cross-sectional views illustrating a structure example of a transistor.
Figure 13C:
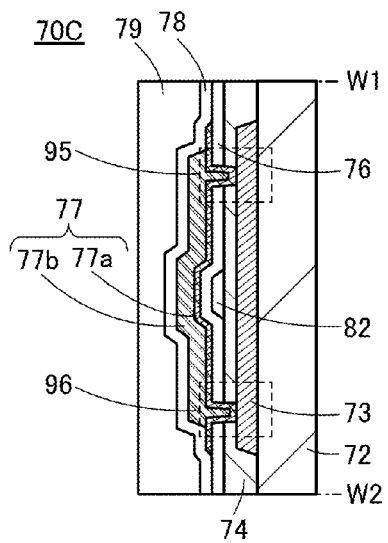
Figure 13B:
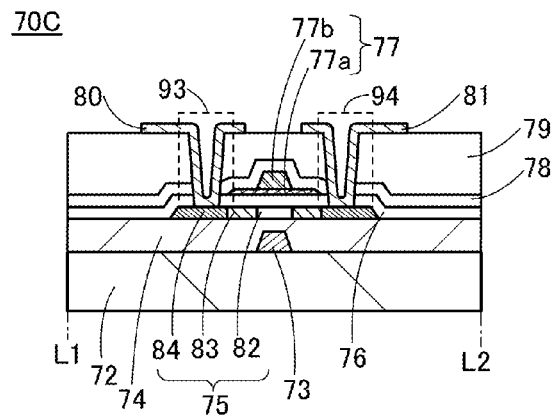

In addition, FIG. 13A is a top view of a transistor 70C. FIG. 13B is a cross-sectional view along line L1-L2 in FIG. 13A. FIG. 13C is a cross-sectional view along line W1-W2 in FIG. 13A.

The transistor 70C is formed over the substrate 72. The transistor 70C includes the conductive layer 73, the conductive layer 77, the semiconductor layer 75, the conductive layer 80, and the conductive layer 81. The conductive layer 77 functions as a gate and includes conductive layers 77a and 77b.

The semiconductor layer 75 overlaps with the insulating layer 74 with the conductive layer 73 provided therebetween and overlaps with the conductive layer 77 with the insulating layer 76 provided therebetween. The openings 95 and 96 are provided in the insulating layers 74 and 76. The conductive layer 77 and the conductive layer 73 are electrically connected to each other through the openings 95 and 96. The conductive layer 77 is covered by the insulating layers 78 and 79. The conductive layers 80 and 81 functioning as a source electrode and a drain electrode are provided over the insulating layer 79. The openings 93 and 94 are provided with the insulating layers 78 and 79. The conductive layer 80 is electrically connected to the semiconductor layer 75 through the opening 93, and the conductive layer 81 is electrically connected to the semiconductor layer 75 through the opening 94.

The semiconductor layer 75 includes a channel formation region 82, a LDD region 83, and an impurity region 84. The LDD region 83 and the impurity region 84 can be formed in a self-aligned manner by adding an impurity by ion doping through the conductive layer 77a which does not overlap with the conductive layer 77b. Thus, the length of the LDD region 83 overlapping with the conductive layer 77a can be precisely controlled. Therefore, hot carrier degradation can be suppressed and the lifetime can be longer, so that a highly reliable semiconductor device can be fabricated in a high yield.

The transistor 70C has a structure in which the channel formation region 82 of the semiconductor layer 75 is electrically surrounded in the channel width direction by the conductive layer 77 functioning as a gate, the conductive layer 73 functioning as a back gate which is electrically connected to the conductive layer 77. That is, the structure can be a structure in which the channel formation region is wrapped from the upper side, lower side, and side surfaces. Thus, the on-state current can be increased and the size in the channel width direction can be reduced. In addition, the channel formation region is surrounded by the conductive film in this structure, so that light can be easily blocked in the channel formation region. Furthermore, photoexcitation due to unintentional light irradiation of the channel formation region can be suppressed.

The transistor 70C can be prevented from being turned on due to an unintentional increase of the conductivity of a side edge of the semiconductor layer 75 in the channel width direction. The influence due to distribution variations of the impurity elements added to the LDD region 83 and the impurity region 84 can be reduced.

Note that the transistor 70C shown in FIGS. 13A to 13C is an example and another structure can be used. Although the transistor 70C has a structure in which the gate and the back gate are electrically connected to each other, a structure in which the gate and the back gate are not electrically connected to each other and different potentials may be supplied to them as in the transistor 70B is also effective. This structure is particularly effective in a circuit formed using only n-channel transistors. That is, the threshold voltage of the transistor can be controlled by voltage application to the back gate; thus, a logic circuit such as an inverter circuit can be formed using transistors having different threshold voltages. The use of such a logic circuit as a driver circuits for driving pixels can reduce the area occupied by the driver circuit, so that a display device having a narrower frame can be provided. The voltage of the back gate is set to a voltage at which the transistor is turned off, whereby the off-state current can be further decreased when the transistor is turned off. Therefore, even when the display device has a large refresh rate, written voltage can be kept being held. This should reduce power consumption of the display device due to a smaller number of writings.

FIGS. 14A to 14C and FIGS. 15A to 15C show other structure examples of transistors.

Figure 14A:
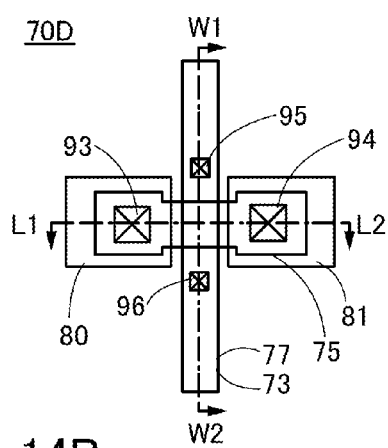
FIGS. 14A to 14C are a top view and cross-sectional views illustrating a structure example of a transistor.
Figure 14C:
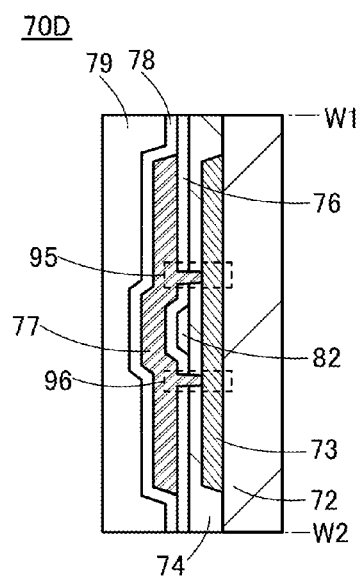
Figure 14B:
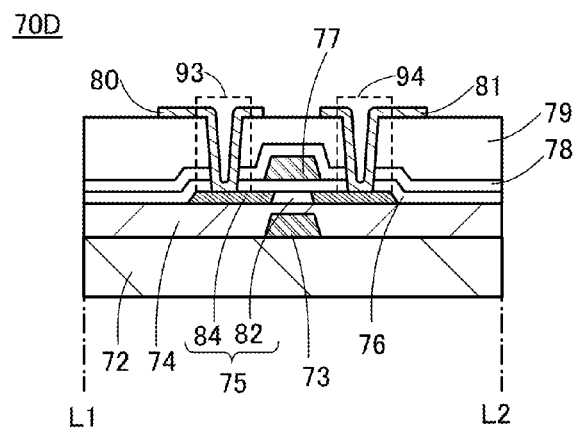

A transistor 70D shown in FIGS. 14A to 14C is different from the transistor 70C in that the conductive layer 77 functioning as a gate is formed as a single layer and the openings 95 and 96 are positioned closer to the channel formation region 82. This can make it easier to apply an electric field to the channel formation region from the upper side, lower side, and side surfaces of the channel formation region in the transistor 70D. In addition, the transistor D with this structure also has the s-channel structure like the transistor 70C, and can have the effect thereof.

A transistor 70E shown in FIGS. 15A to 15C is different from the transistor 70C in the structure in which the conductive layer 73 functioning as a back gate of the transistor 70E is formed of a conductive layer 73a and a conductive layer 73b and the conductive layer 73b is surrounded by the conductive layer 73a. The transistor E with this structure also has the s-channel structure like the transistor 70C, and can have the effect thereof.

In addition, even when an element having mobility (e.g., copper (Cu)) is used for the conductive layer 73b in the transistor 70E, deterioration of the semiconductor film due to entry of the element having mobility into the semiconductor film can be prevented.

Note that, as materials of the conductive layer 73a functioning as a barrier film positioned over a surface on which a wiring is formed, any of tungsten (W), molybdenum (Mo), chromium (Cr), titanium (Ti), and tantalum (Ta), which are high melting point materials, an alloy thereof (e.g., W—Mo, Mo—Cr, or Ta—Mo), a nitride thereof (e.g., tungsten nitride, titanium nitride, or tantalum nitride), or the like can be used. A sputtering method, a CVD method, or the like can be adopted as the formation method. As the materials for the conductive layer 73b, copper (Cu) is preferable; however, there is no particular limitation as long as the materials are low resistance materials. For example, silver (Ag), aluminum (Al), gold (Au), an alloy thereof, or the like can also be used. As the formation method of the conductive layer 73b, a sputtering method is preferable; however, a CVD method can be adopted as long as conditions that do not damage the resist mask are selected.

An example is shown here in which an n-channel transistor 70 and a p-channel transistor 71 are formed on the same substrate. A CMOS circuit and the like can be formed by a combination of an n-channel transistor and a p-channel transistor. Such an example is illustrated in FIG. 16A.

Figure 16A:
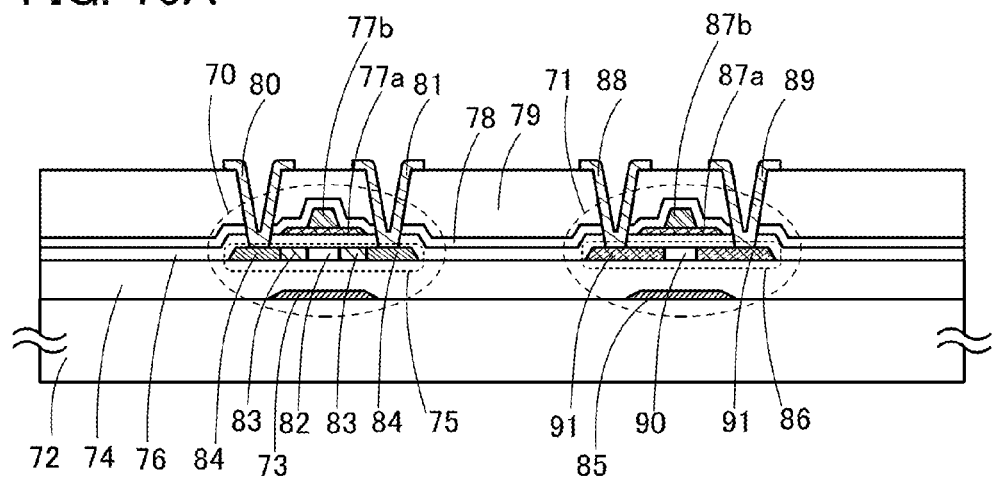
FIGS. 16A and 16B are cross-sectional views each illustrating a structure example of a transistor.

The n-channel transistor 70 and the p-channel transistor 71 shown in FIG. 16A each have an s-channel structure like the transistor 70A. The transistors 70 and 71 are formed over the substrate 72 having an insulating surface.

The transistor 70 includes the conductive layer 73 functioning as a gate, the insulating layer 74 over the conductive layer 73, the semiconductor layer 75 overlapping with the conductive layer 73 with the insulating layer 74 provided therebetween, the insulating layer 76 over the semiconductor layer 75, the conductive layer 77a and the conductive layer 77b functioning as gates and overlapping with the semiconductor layer 75 with the insulating layer 76 provided therebetween, the insulating layer 78 over the conductive layers 77a and 77b, the insulating layer 79 over the insulating layer 78, and the conductive layer 80 and the conductive layer 81 functioning as a source electrode and a drain electrode and electrically connected to the semiconductor layer 75 through openings provided in the insulating layers 78 and 79.

The width in the channel length direction of the conductive layer 77b is shorter than that of the conductive layer 77a. The conductive layers 77a and 77b are stacked in this order from the insulating layer 76 side. The semiconductor layer 75 includes the channel formation region 82 overlapping with the conductive layer 77b, the pair of LDD regions 83 between which the channel formation region 82 is sandwiched, and the pair of impurity regions 84 between which the channel formation region 82 and the LDD regions 83 are sandwiched. The pair of impurity regions 84 function as a source region and a drain region.

The transistor 71 includes a conductive layer 85 functioning as a gate, the insulating layer 74 over the conductive layer 85, a semiconductor layer 86 overlapping with the conductive layer 85 with the insulating layer 74 provided therebetween, the insulating layer 76 over the semiconductor layer 86, a conductive layer 87a and a conductive layer 87b functioning as gates and overlapping with the semiconductor layer 86 with the insulating layer 76 provided therebetween, the insulating layer 78 over the conductive layers 87a and 87b, the insulating layer 79 over the insulating layer 78, and a conductive layer 88 and a conductive layer 89 functioning as a source electrode and a drain electrode and electrically connected to the semiconductor layer 86 through openings provided in the insulating layers 78 and 79.

The width in the channel length direction of the conductive layer 87b is shorter than that of the conductive layer 87a. The conductive layers 87a and 87b are stacked in this order from the insulating layer 76 side. The semiconductor layer 86 includes a channel formation region 90 overlapping with the conductive layer 87b, and a pair of impurity regions 91 between which the channel formation region 90 is sandwiched. The pair of impurity regions 91 function as a source region and a drain region.

Figure 16B:
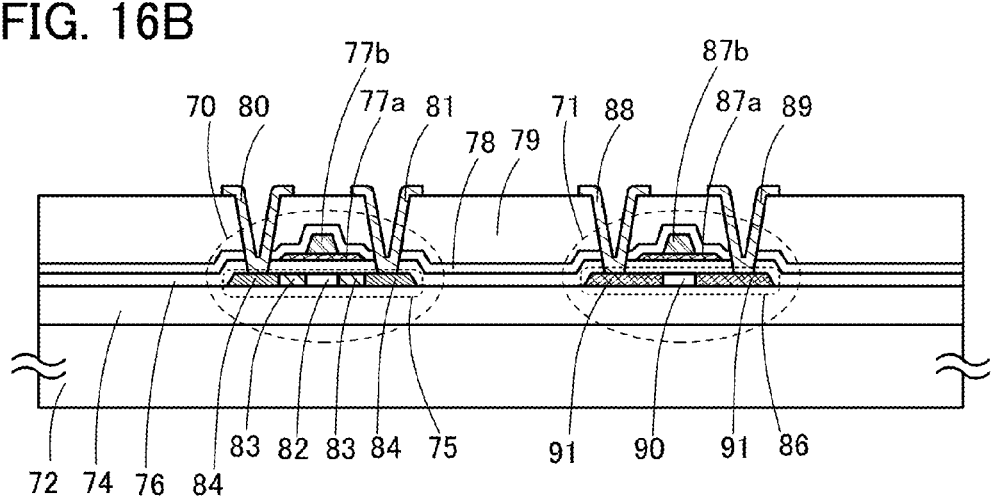

Although FIG. 16A illustrates a structure including the conductive layers 77a and 77b functioning as gates and the conductive layer 73 functioning as a back gate, another structure can be used. For example, the conductive layer 73 functioning as a back gate may be omitted as shown in FIG. 16B. Although FIG. 16A illustrates a structure including the conductive layers 87a and 87b functioning as gates and the conductive layer 85 functioning as a back gate, the other structure can be used. For example, the conductive layer 85 functioning as a back gate may be omitted as shown in FIG. 16B.

Embodiment 3

In this embodiment, a display module and electronic devices which include a display device or display system of one embodiment of the present invention will be described with reference to FIG. 17 and FIGS. 18A to 18H.

Figure 17:
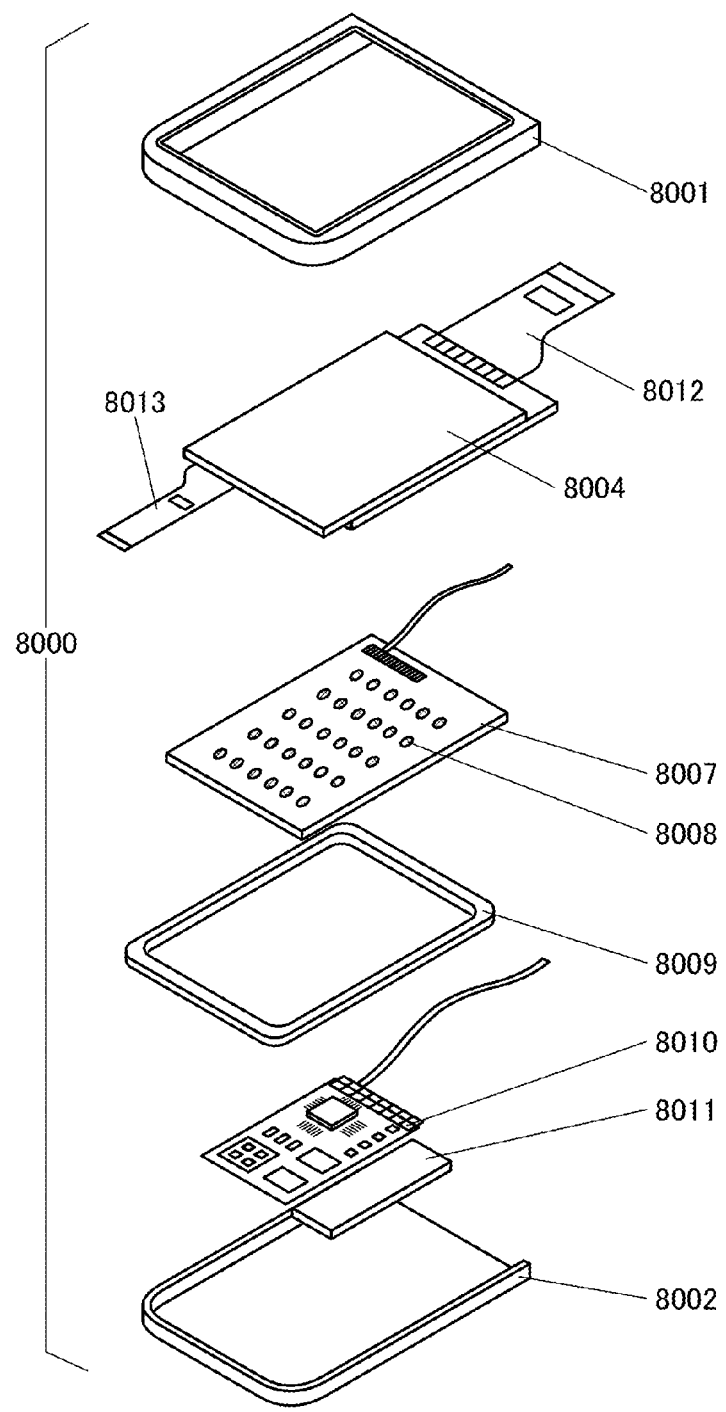
FIG. 17 illustrates a structure example of a display module including a touch panel module.

In a display module 8000 illustrated in FIG. 17, a touch panel 8004, a frame 8009, a printed board 8010, and a battery 8011 are provided between an upper cover 8001 and a lower cover 8002. The display module 8000 may be additionally provided with an optical member such as a polarizing plate, a retardation plate, or a prism sheet.

The touch panel module of one embodiment of the present invention is used for the touch panel 8004. The touch panel 8004 is connected to FPCs 8012 and 8013. The shapes and sizes of the upper cover 8001 and the lower cover 8002 can be changed as appropriate in accordance with the sizes of the touch panel 8004.

The frame 8009 protects the touch panel 8004 and also functions as an electromagnetic shield for blocking electromagnetic waves generated by the operation of the printed board 8010. The frame 8009 may also function as a radiator plate.

The printed board 8010 is provided with a power supply circuit and a signal processing circuit for outputting a video signal and a clock signal. As a power source for supplying power to the power supply circuit, an external commercial power source or a power source using the battery 8011 provided separately may be used. The battery 8011 can be omitted in the case of using a commercial power source.

A back light unit 8007 may be provided as shown in FIG. 17 in the case of using a transmissive liquid crystal element. The backlight unit 8007 includes a light source 8008. Note that although a structure in which the light sources 8008 are provided over the backlight unit 8007 is illustrated in FIG. 17, one embodiment of the present invention is not limited to this structure. For example, a light diffusion plate whose end portion is provided with the light source may be used as the backlight unit 8007. In addition, a wavelength conversion member may be provided between the backlight unit 8007 and the touch panel 8004. The wavelength conversion member contains a wavelength conversion substance such as a fluorescent pigment, a fluorescent dye, or a quantum dot. Such a wavelength conversion substance can absorb light from the backlight unit 8007 and convert part of or the whole of the light into light with another wavelength. The quantum dot that is one of wavelength conversion substances is a particle having a diameter of from 1 nm to 100 nm inclusive. With the use of the wavelength conversion member containing a quantum dot, the color reproducibility of the display device can be increased. Furthermore, the wavelength conversion member may function as a light-guiding plate.

The touch panel module of Embodiment 1 described above can be used for a display portion of various kinds of electronic devices. FIGS. 18A to 18H illustrate examples of electronic devices. These electronic devices can each include a housing 5000, a display portion 5001, a speaker 5003, an LED lamp 5004, operation keys 5005 (including a power switch or an operation switch), a connection terminal 5006, a sensor 5007 (a sensor having a function of measuring force, displacement, position, speed, acceleration, angular velocity, rotational frequency, distance, light, liquid, magnetism, temperature, chemical substance, sound, time, hardness, electric field, current, voltage, electric power, radiation, flow rate, humidity, gradient, oscillation, smell, or infrared ray), a microphone 5008, and the like.

Figure 18A:
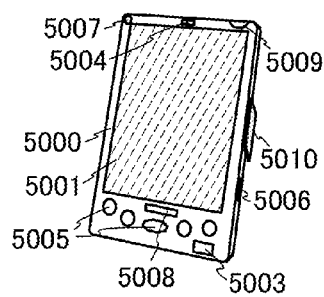
FIGS. 18A to 18H each illustrate a structure example of an electronic device.
Figure 18B:
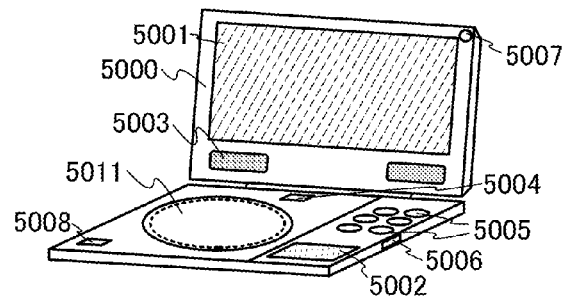
Figure 18C:
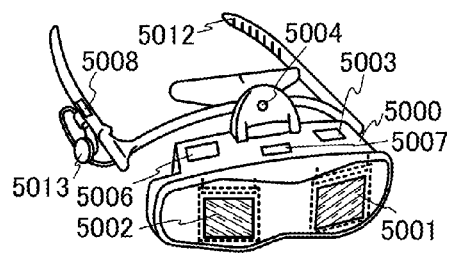
Figure 18D:
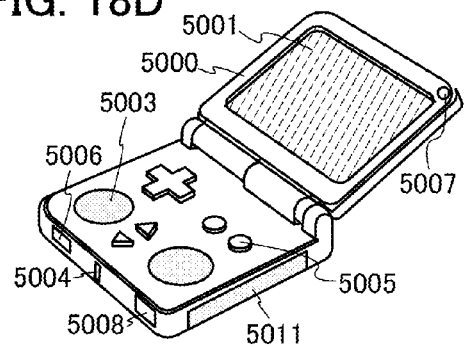
Figure 18E:
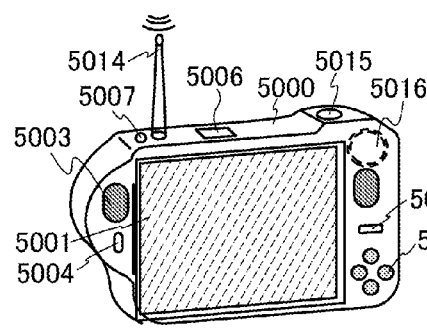
Figure 18F:
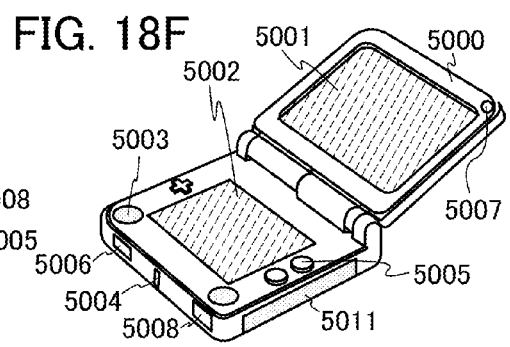
Figure 18G:
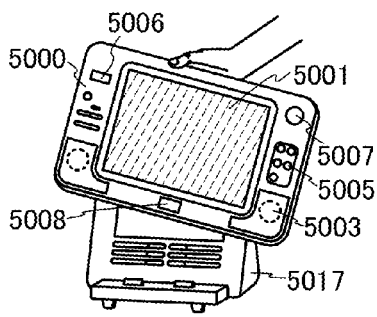
Figure 18H:
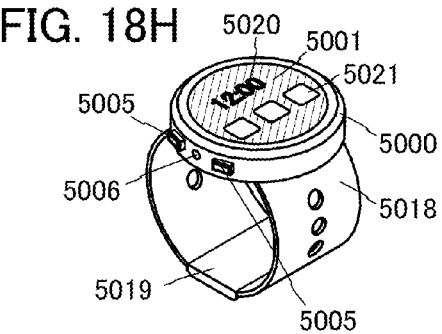

FIG. 18A illustrates a mobile computer that can include a switch 5009, an infrared port 5010, and the like in addition to the above components. FIG. 18B illustrates a portable image reproducing device (e.g., a DVD player) that is provided with a memory medium and can include a second display portion 5002, a memory medium reading portion 5011, and the like in addition to the above components. FIG. 18C illustrates a goggle-type display that can include the second display portion 5002, a support 5012, an earphone 5013, and the like in addition to the above components. FIG. 18D illustrates a portable game machine that can include the memory medium reading portion 5011 and the like in addition to the above components. FIG. 18E illustrates a digital camera that has a television reception function and can include an antenna 5014, a shutter button 5015, an imaging unit 5016, and the like in addition to the above components. FIG. 18F illustrates a portable game machine that can include the second display portion 5002, the memory medium reading portion 5011, and the like in addition to the above components. FIG. 18G illustrates a portable television receiver that can include a charger 5017 capable of transmitting and receiving signals, and the like in addition to the above components. FIG. 18H illustrates a wrist-watch-type information terminal that can include a band 5018, a clasp 5019, and the like in addition to the above components. The display portion 5001 mounted in the housing 5000, which is also a bezel, includes a non-rectangular display region. The display portion 5001 can display an icon 5020 indicating time, another icon 5021, and the like.

The electronic devices illustrated in FIGS. 18A to 18H can have a variety of functions: for example, a function of displaying a variety of information (e.g., a still image, a moving image, and a text image) on a display portion, a touch panel function, a function of displaying a calendar, date, time, and the like, a function of controlling processing with the use of a variety of software (programs), a wireless communication function, a function of being connected to a variety of computer networks with the use of a wireless communication function, a function of transmitting and receiving a variety of data with the use of a wireless communication function, and a function of reading a program or data stored in a memory medium and displaying the program or data on a display portion. Furthermore, the electronic device including a plurality of display portions can have a function of displaying image data mainly on one display portion while displaying text data on another display portion, a function of displaying a three-dimensional image by displaying images on a plurality of display portions with a parallax taken into account, or the like. Furthermore, the electronic device including an imaging unit can have a function of shooting a still image, a function of shooting a moving image, a function of automatically or manually correcting a shot image, a function of storing a shot image in a memory medium (an external memory medium or a memory medium incorporated in the camera), a function of displaying a shot image on the display portion, or the like. Note that functions that can be provided for the electronic devices illustrated in FIGS. 18A to 18H are not limited to those described above, and the electronic devices can have a variety of functions.

This application is based on Japanese Patent Application serial No. 2015-060598 filed with Japan Patent Office on Mar. 24, 2015, the entire contents of which are hereby incorporated by reference.

What is claimed is:

1. A touch panel comprising:
a first substrate;
a second substrate;
a liquid crystal layer;
a pixel electrode;
a common electrode; and
a touch sensor comprising a first electrode, two second electrodes, a third electrode, and a fourth electrode,
wherein the first substrate and the second substrate face each other,
wherein the liquid crystal layer is provided between the first substrate and the second substrate,
wherein the first substrate is provided with the pixel electrode and the common electrode,
wherein alignment of the liquid crystal layer is controlled by an electric field between the pixel electrode and the common electrode,
wherein the second substrate is provided with the touch sensor,
wherein the first electrode and the two second electrodes are formed using a first conductive film,
wherein the third electrode and the fourth electrode are formed using a second conductive film,
wherein the first electrode and the two second electrodes are each a mesh electrode having a plurality of openings,
wherein the first electrode extends in a first direction,
wherein the two second electrodes are provided along a second direction with the first electrode therebetween,
wherein the two second electrodes are electrically connected to each other by the third electrode,
wherein the third electrode comprises a region overlapping with the first electrode, and
wherein the fourth electrode is provided to face the pixel electrode and the common electrode with the liquid crystal layer therebetween.

2. The touch panel according to claim 1, wherein the second conductive film comprises a metal oxide film.

3. The touch panel according to claim 1,
wherein the second substrate is provided with a light-blocking layer and a color filter, and
wherein, in each of the first electrode and the two second electrodes, a portion formed using the first conductive film overlaps with the light-blocking layer and the plurality of openings overlap with the color filter.

4. The touch panel according to claim 3, wherein the light-blocking layer and the color filter are provided in a same layer.

5. The touch panel according to claim 3,
wherein the light-blocking layer and the color filter are provided in different layers, and
wherein the color filter is provided between the fourth electrode and the second substrate.

6. The touch panel according to claim 3,
wherein the light-blocking layer and the color filter are provided in different layers, and
wherein the color filter is provided between the fourth electrode and the liquid crystal layer.

7. The touch panel according to claim 3,
wherein the color filter comprises at least three coloring layers, and
wherein the light-blocking layer comprises a stack of the coloring layers of at least two colors.

8. A touch panel comprising:
a first substrate;
a pixel electrode over the first substrate;
a liquid crystal layer over the pixel electrode;
a touch sensor over the liquid crystal layer, the touch sensor comprising a first electrode, two second electrodes, a third electrode and a fourth electrode,
wherein the two second electrodes are each a mesh electrode comprising a plurality of openings,
wherein the first electrode is provided between the two second electrodes,
wherein the two second electrodes are electrically connected to each other by the third electrode,
wherein the third electrode and the first electrode overlap with each other, and
wherein the fourth electrode and the pixel electrode overlap with each other.

9. The touch panel according to claim 8, wherein each of the third electrode and the fourth electrode comprises a metal oxide film.

10. The touch panel according to claim 8, further comprising a light-blocking layer and a color filter, and wherein the two second electrodes and the light-blocking layer overlap with each other, and wherein the plurality of openings and the color filter overlap with each other.

11. The touch panel according to claim 10, wherein the light-blocking layer and the color filter are provided in a same layer.

12. The touch panel according to claim 10,
wherein the light-blocking layer and the color filter are provided in different layers, and
wherein the color filter is provided over the fourth electrode.

13. The touch panel according to claim 10,
wherein the light-blocking layer and the color filter are provided in different layers, and
wherein the color filter is provided under the fourth electrode.

14. The touch panel according to claim 10,
wherein the color filter comprises at least three coloring layers, and
wherein the light-blocking layer comprises a stack of the coloring layers of at least two colors.

* * * * *